(12) United States Patent
Lee et al.

(10) Patent No.: US 9,363,735 B2
(45) Date of Patent: Jun. 7, 2016

(54) DEVICE AND METHOD FOR PROVIDING SIMULTANEOUS DATA TRANSMISSION SERVICE OVER HETEROGENEOUS NETWORKS

(71) Applicant: SK TELECOM CO., LTD., Seoul (KR)

(72) Inventors: Gyu Min Lee, Yongin-si (KR); Jeong Su Kim, Seongnam (KR); In Jang Jeong, Seoul (KR); Kyung Hoon Kim, Bucheon-si (KR)

(73) Assignee: SK TELECOM CO., LTD., Seoul (KR)

( * ) Notice: Subject to any disclaimer, the term of this patent is extended or adjusted under 35 U.S.C. 154(b) by 156 days.

(21) Appl. No.: 14/095,307

(22) Filed: Dec. 3, 2013

(65) Prior Publication Data

US 2014/0092890 A1    Apr. 3, 2014

Related U.S. Application Data

(63) Continuation of application No. PCT/KR2012/004136, filed on May 24, 2012.

(30) Foreign Application Priority Data

Jun. 3, 2011    (KR) .................. 10-2011-0054096
Jun. 29, 2011   (KR) .................. 10-2011-0063726

(51) Int. Cl.
*H04W 48/08*    (2009.01)
*H04W 36/14*    (2009.01)
(Continued)

(52) U.S. Cl.
CPC .............. *H04W 48/08* (2013.01); *H04W 36/14* (2013.01); *H04W 24/04* (2013.01); *H04W 76/025* (2013.01)

(58) Field of Classification Search
CPC ........ H04L 63/18; H04L 12/66; G06F 21/606
See application file for complete search history.

(56) References Cited

U.S. PATENT DOCUMENTS

| 8,428,087 B1 * | 4/2013 | Vincent .................. 370/474 |
| 2004/0193878 A1 * | 9/2004 | Dillinger et al. ............. 713/165 |
| 2009/0187674 A1 | 7/2009 | Lee et al. |

FOREIGN PATENT DOCUMENTS

| JP | 2003037636 A | 2/2003 |
| JP | 2009004855 A | 1/2009 |

(Continued)

OTHER PUBLICATIONS

International Search Report mailed Nov. 27, 2012 for PCT/KR2012/004136.

(Continued)

*Primary Examiner* — Siming Liu
(74) *Attorney, Agent, or Firm* — Hauptman Ham, LLP

(57) ABSTRACT

Disclosed are a device and a method for providing simultaneous data transmission service based on heterogeneous networks. A transmission device of system for simultaneous data transmission service system is configured to (i) divide data into two or more partial data, (ii) insert virtual network access information into each of the divided two or more partial data, and (iii) then transmit the divided two or more partial data to a reception device over two or more networks in a heterogeneous network. When a problem occurrence is identified in a first network of the two or more networks, the transmission device is configured to switch the first network to another second network of the two or more networks to transmit the divided two or more partial data intended to be transmitted over the first network.

15 Claims, 9 Drawing Sheets

(51) Int. Cl.
*H04W 24/04* (2009.01)
*H04W 76/02* (2009.01)

(56) References Cited

FOREIGN PATENT DOCUMENTS

| JP | 2009296084 A | 12/2009 |
| KR | 1020060065427 A | 6/2006 |
| KR | 1020070008572 A | 1/2007 |
| KR | 1020070041096 A | 4/2007 |
| KR | 1020080058382 A | 6/2008 |
| KR | 1020090080742 A | 7/2009 |

OTHER PUBLICATIONS

Korean Office Action dated Oct. 18, 2013 for application No. 10-2011-0063726.
Korean Office Action dated Jun. 20, 2012 for application No. 10-2011-0054096.
Korean Notice of Allowance dated Apr. 23, 2013 for application No. 10-2011-0063726.

* cited by examiner

DEVICE AND METHOD FOR PROVIDING SIMULTANEOUS DATA TRANSMISSION SERVICE OVER HETEROGENEOUS NETWORKS

CROSS-REFERENCE TO RELATED APPLICATION

The present application is a continuation of International Application No. PCT/KR2012/004136 filed on May 24, 2012, which is based on, and claims priorities from, KR Application Serial Number 10-2011-0054096, filed on Jun. 3, 2011 and KR Application Serial Number 10-2011-0063726, filed on Jun. 29, 2011. The disclosures of the above-listed applications are hereby incorporated by reference herein in their entirety.

FIELD

The present disclosure relates to a method and device for providing a heterogeneous network based-simultaneous data transmission service over two or more networks of in a heterogeneous network environment

BACKGROUND

The statements in this section merely provide background information related to the present disclosure and may not constitute prior art.

Recently, a service provider simultaneously provides services based on a plurality of wireless technologies in many cases. A main domestic service provider has introduced WCDMA, CDMA, WiBro, and a WLAN (WiFi) technology corresponding to a wireless local area network to construct and service a network. Further, currently, a Long Term Evolution (LTE) network is actively introduced.

The inventor(s) have experienced that in a heterogeneous network environment where various networks coexist, a current method in which a terminal device uses a data service through the heterogeneous networks may correspond to a passive method in that the method is an access network selection method by a direct change by a terminal device user which excludes a service provider's controllability when a service provider side is considered.

Meanwhile, at present, as various wireless devices such as a smart phone, a tablet PC and the like increase, a data service charge decreases, and various large-capacity data services increase, a network load rate of the service provider rapidly increases, and thus network investment costs are excessively spent and service stability is threatened.

Accordingly, the inventor(s) have noted that a new service scheme capable of actively selecting an access network of a terminal device according to a network status in the heterogeneous network environment where various networks coexist and efficiently transmitting data by using the selected network is required.

SUMMARY

In accordance with some embodiments, a transmission device is configured to provide a simultaneous data transmission service over two or more networks in a heterogeneous network, and comprises a controller and a communication unit. The controller is configured to divide data to be transmitted into two or more partial data. The communication unit is configured to transmit the divided two or more partial data to a reception device through at least one of the two or more networks. Further, the controller is configured to: insert, into first partial data of the divided two or more partial data, network access information of the reception device corresponding to a first network of the two or more networks and virtual network access information corresponding to the transmission device or the reception device; and insert, into second partial data of the divided two or more partial data, network access information of the reception device corresponding to a second network of the two or more networks and virtual network access information corresponding to the transmission device or the reception device. Further, the communication unit is configured to: transmit the first partial data with the corresponding inserted information to the reception device through the first network; and transmit the second partial data with the corresponding inserted information to the reception device through the second network, wherein the first and second networks are different networks of heterogeneous networks.

In accordance with some embodiments, a reception device is configured to provide a simultaneous data transmission service over two or more networks in a heterogeneous network, and comprises a communication unit and a controller. The communication unit is configured to receive two or more partial data divided from data to be transmitted from a transmission device through at least one of the two or more networks. And the controller is configured to combine the received two or more partial data by using virtual network access information corresponding to the transmission device or the reception device inserted into the received two or more partial data, wherein the virtual network access information is independent of the two or more networks.

In accordance with some embodiments, the transmission device is configured provide simultaneous data transmission service over two or more networks in a heterogeneous network. The transmission device is configured to divide data to be transmitted into two or more partial data; transmit first partial data of the divided two or more partial data over a first network of the two or more networks, the first partial data including network access information of a reception device corresponding to the first network and virtual network access information corresponding to the transmission device or the reception device; and transmit second partial data of the divided two or more partial data, over a second network of the two or more networks, the second partial data including network access information of the reception device corresponding to the second network and virtual network access information corresponding to the transmission device or the reception device.

In accordance with some embodiments, the reception device is configured to provide a simultaneous data transmission service over two or more networks in a heterogeneous network. The reception device is configured to receive two or more partial data divided from data to be transmitted from a transmission device through the two or more networks; identify virtual network access information corresponding to the transmission device or the reception device included in the received two or more partial data, wherein the virtual network access information is independent of the two or more networks; and reconstitute the data by combining the received two or more partial data based on the identified virtual network access information.

BRIEF DESCRIPTION OF THE DRAWINGS

The above and other objects, features and advantages of various embodiments of the present disclosure will be more apparent from the following detailed description taken in conjunction with the accompanying drawings, in which.

DETAILED DESCRIPTION

Hereinafter, at least one embodiment of the present disclosure will be described with reference to the accompanying drawings.

Figure 1:
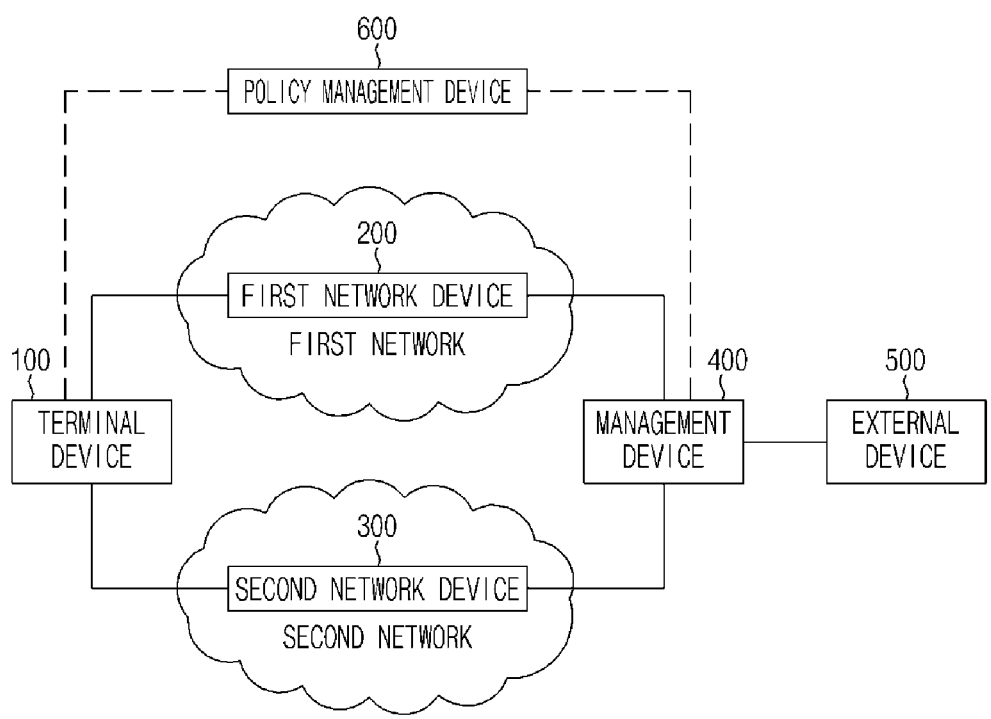
FIG. 1 is a schematic block diagram of a heterogeneous network based-simultaneous data transmission service system according to at least one embodiment of the present disclosure.

FIG. 1 is a schematic block diagram of a heterogeneous network based-simultaneous data transmission service system according to at least one embodiment of the present disclosure As illustrated in FIG. 1, a heterogeneous network-based simultaneous data transmission service system according to the present disclosure includes a terminal device 100 corresponding to a transmission device configured to divide particular data into two or more partial data, insert particular virtual network access information into first partial data corresponding to a part of the two or more partial data and transmit the first partial data, and insert virtual network access information into second partial data corresponding to another part of the two or more partial data and transmit the second partial data, a first network device 200 configured to receive the first partial data from the terminal device 100, a second network device 300 configured to receive the second partial data from the terminal device 100, and a management device 400 corresponding to a reception device configured to respectively receive the first partial data from the first network device 200 and the second partial data from the second network device 300 and then combine the received first partial data and the received second partial data according to particular virtual network access information based on the virtual network access information inserted into the received first partial data and second partial data to thereby reconstitute (or generate) the data. In some embodiments, e.g., in uplink process shown as FIG. 4, the terminal device 100 is configured to function as a transmission device and the management device 400 is configured to function as reception device. In further embodiments, e.g., in a downlink process shown as FIG. 5, the terminal device 100 is configured to function as a reception device and the management device 400 is configured to function as transmission device.

Further, the heterogeneous network-based simultaneous data transmission service system according to the present disclosure includes an external device 500 configured to receive combined data (i.e., reconstituted data) from the management device 400 and a policy management device 600 configured to provide a network selection policy.

A heterogeneous network-based simultaneous data transmission service system according to the present disclosure implements a configuration of dividing data and, transmitting and/or receiving the divided data by using a plurality of heterogeneous networks in data transmission and/or data reception between the terminal device 100 and the external device 500.

Accordingly, the management device 400 performs session division to achieve simultaneous link transmission through the plurality of heterogeneous networks for one session. At this time, since the terminal device 100 is connected to each of the plurality of heterogeneous networks, the management device 400 recognizes that each of the simultaneous links through the plurality of heterogeneous networks corresponds to a link of one terminal device 100 and manages the terminal device 100 for the simultaneous links as one terminal device 100, that is, one subject. To this end, it is necessarily required to allocate (and/or manage) separate virtual network access information (for example, a virtual IP) for the simultaneous transmission service in accordance with the terminal device 100.

The external device 500 refers to a server device for performing data transmission/reception with the terminal device 100 through the management device 400, and can provide various services such as a portal service, a content providing service and the like to the terminal device 100 through the data transmission and/or reception by the management device 400.

Further, the policy management device 600 determines a network selection policy based on various network parameters on the heterogeneous networks including, for example, a subscriber preference, a subscriber type, a subscription payment system, an application type to be serviced and the like, and network status information according to a network status change received from the terminal device 100 and the management device 400. And the policy management device 600 provides the determined network selection policy to the terminal device 100 and the management device 400.

Meanwhile, the heterogeneous networks may correspond to various access networks including, for example, WCDMA, CDMA, WiBro, WLAN (WiFi), and Long Term Evolution (LTE), but in at least one embodiment the heterogeneous networks will be exemplarily described, but not limited thereto, as a first network (hereinafter, referred to as a "3G network") which refers to a wireless packet service network (WCDMA) and a second network (hereinafter, referred to as a "WiFi network") which refers to a wireless local area network for convenience of the description).

Accordingly, the first network device 200 refers to Gateway GPRS Support Node (GGSN) equipment for operating the 3G network, that is, the wireless packet service network, and the second network device 300 refers to an Access Point (AP) for operating the WiFi network, that is, the wireless local area network.

Further, the terminal device 100 and the management device 400 can be a transmission device or a reception device in viewpoint of a service flow, that is, a subject transmitting data by using the simultaneous data transmission service, that is, an uplink process and a downlink process. In at least one embodiment, it is assumed that the terminal device 100 corresponds to a device for performing data transmission/reception located in the heterogeneous network environment and the management device 400 corresponds to a device for providing the simultaneous data transmission service to the terminal device 100 for convenience of the description.

First, in order to use the simultaneous data transmission service in the heterogeneous network environment, a process of acquiring access information between the terminal device 100 and the management device 400 is first performed.

In this connection, the terminal device 100 receives its own first network access information (for example, a 3G IP) from the first network device 200 according to a conventional access information allocation method by registering a position in the 3G network and makes a request for access information of the management device 400 for the access to the 3G network to the first network device 200. Further, the terminal device 100 receives its own second network access information (for example, a WiFi IP) from the second network device 300 according to a conventional access information allocation method by accessing the WiFi network.

Accordingly, the first network device 200 acquires the access information for the access to the 3G network of the management device 400, that is, the access information of the management device 400 for the access to the 3G network as a private IP from a separate address allocation device, for example, a DNS server according to an access information request transmitted from the terminal device 100 and transmits the acquired access information to the terminal device 100. The terminal device 100 recognizes the access information (for example, a management device 3G IP) of the management device 400 for the access to the 3G network by which the terminal device 100 can access the management device 400 through the first network, that is, the 3G network.

Further, the terminal device 100 additionally makes a request for access information of the management device 400 for the access to the WiFi network to the first network device 200.

Accordingly, the first network device 200 acquires access information for the access to the WiFi network of the management device 400, that is, the access information of the management device 400 for the access to the WiFi network as a public IP mapped into the access information of the management device 400 for the access to the 3G network from a separate address allocation device, for example, a DNS server and transmits the acquired access information to the terminal device 100. The terminal device 100 recognizes the access information of the management device 400 for the access to the WiFi network by which the terminal device 100 can access the management device 400 through the second network, that is, the WiFi network.

Meanwhile, acquiring/recognizing, by the terminal device 100, the access information of the management device 400 for the access to the 3G network and the access information of the management device 400 for the access to the WiFi network by transmitting a request to the first network device 200 is only an example embodiment, but acquiring/recognizing, by the terminal device 100, the access information of the management device 400 for the access to the 3G network and the access information of the management device 400 for the access to the WiFi network can be achieved through various processes.

Next, when the process of acquiring the access information of the management device 400 is completed, a service registration process between the terminal device 100 and the management device 400 is performed.

In this connection, the terminal device 100 accesses the management device 400 through at least one of the networks based on the acquired access information for the access to the 3G network and access information for the access to the WiFi network to make a request for the service registration.

For example, the terminal device 100 accesses the management device 400 through the first network, that is, the 3G network based on the acquired access information of the management device 400 for the access to the 3G network and transmits a binding update message to make a request for service-registering the terminal device 100 itself. Then, the management device 400 performs the service registration of the terminal device 100 by identifying additional information contained in the service registration request, for example, device identification information (for example, IMSI), first network access information (for example, the 3G IP), network type information (for example, the 3G network) indicating a network type through which the binding update message is transmitted, and service classification information (initial, update, and remove) and transmits a binding update response message (binding update ack) to the terminal device 100, there by performing the service registration process through the 3G network.

Further, the terminal device 100 accesses the management device 400 through the second network, that is, the WiFi network based on the acquired access information of the management device 400 (for example, the management device WiFi IP) and transmits a binding update message to make a request for service-registering the terminal device 100 itself. Then, the management device 400 performs the service registration of the terminal device 100 by identifying additional information contained in the service registration request, for example, device identification information (for example, IMSI), second network access information (for example, the WiFi IP), network type information (for example, the WiFi network) indicating a network type through which the binding update message is transmitted, and service classification information (initial, update, and remove) and transmits a binding update response message (binding update ack) to the terminal device 100, thereby performing the service registration process through the WiFi network.

At this time, the device terminal 100 is allocated and possesses separate network access information (for example, a virtual IP) for the heterogeneous network-based simultaneous data transmission service according to the present disclosure, and the allocation cab be managed by the management device 400.

Then, the terminal device 100 can receive the network access information allocated by the management device 400 during the service registration process through the 3G network or the WiFi network to possess the received network access information, generate the virtual network access information by itself based on pre-possessed device identification information (for example, MDN, IMSI, IMEI and the like) to possess the generated virtual network access information, or use and possess pre-allocated network access information as the virtual network access information.

Further, the management device 400 can manage, for example, table information for each subscriber which includes the first network and second network access information mapped based on the device identification information (for example, IMSI) of the terminal device service-registered for each subscriber, the virtual network access information, the service classification information (initial, update, and remove) and the like based on the additional information contained in the service registration request of the terminal device 100 received through each of the 3G network and the WiFi network.

Meanwhile, in addition to the table information for each subscriber, the management device 400 can manage a network selection policy for traffic distributions in the heterogeneous network environment, for example, a source IP, a source port, a destination IP, a destination port, protocol (UDP, TCP or the like) information, and a traffic distribution rate for each of the 3G network and WiFi network.

As described above, when all the processes for the service registration between the terminal device 100 and the management device 400 are completed, the simultaneous data transmission service through the heterogeneous networks, that is, the 3G network and the WiFi network is initiated for data transmission and/or data reception between the terminal device 100 and the external device 500. Hereinafter, the description will be made based on an uplink process in which the terminal device 100 transmits the data to the management device 400.

The terminal device 100 is configured to divide the data to be transmitted into partial data to use the simultaneous data transmission service.

That is, the terminal device 100 is configured to divide the data to be transmitted into partial data corresponding to the number of networks for the simultaneous data transmission using the heterogeneous networks, that is, the 3G network and the WiFi network, and the division process may be performed according to the network selection policy transmitted from the policy management device 600.

In other words, the terminal device 100 identifies a first transmission rate for data transmission to the first network device 200 and a second transmission rate for data transmission to the second network device 300 included in the network selection policy, selects first partial data to be transmitted to the first network device 200 from the divided partial data, and selects second partial data to be transmitted to the second network device 300 from the remaining partial data of the divided partial data based on the identified transmission rates.

Accordingly, by performing the data division process based on the network selection policy and the traffic distribution rate for each network changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Further, the terminal device 100 is configured to insert the virtual network access information into the first partial data and inserts the virtual network access information into the second partial data.

Of course, the terminal device 100 may insert its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

Further, the terminal device 100 may insert its own second network access information corresponding to the corresponding second network, access information of the management device 400 corresponding to the corresponding second network, that is, access information of the management device 400 for the access to the WiFi network, and access information of the external device 500 corresponding to a final destination into the second partial data as well as the virtual network access information.

Thereafter, the terminal device 100 is configured to transmit the first partial data to the first network device 200 located in the 3G network over the first network, and the first network device 200 is configured to transmit over the first network the first partial data to the management device 400 corresponding to the reception device. Further, the terminal device 100 is configured to transmit the second partial data to the second network device 300 located in the WiFi network over the second network, and the second network device 300 is configured to transmit over the first network the second partial data to the management device 400 corresponding to the reception device.

As described above, the first partial data divided by the terminal device 100 is transmitted to the management device 400 via the 3G network (i.e., the first network), and the divided second partial data is transmitted to the management device 400 via the WiFi network (i.e., the second network).

Meanwhile, when the terminal device 100 uses the simultaneous data transmission service with the management device 400, the terminal device 100 is configured to identify problem occurrence of a particular network through monitoring the 3G network and the WiFi network.

That is, during the process in which the terminal device 100 transmits the first partial data to the management device 400 through the first network device 200 located in the 3G network and transmits the second partial data to the management device 400 through the second network device 300 located in the WiFi network, the terminal device 100 identifies the problem occurrence of the particular network of one or more heterogeneous networks, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

The terminal device 100 switches the WiFi network to the 3G network corresponding to the effective network to transmit through the 3G network the second partial data to be transmitted through the WiFi network.

That is, when the problem occurrence of the WiFi network is identified through monitoring method, the terminal device 100 notifies the problem occurrence of the WiFi network to the management device 400 through the first network device 200 located in the 3G network corresponding to the effective network and transmits the second partial data transmitted through the second network device 300 on the WiFi network through the first network device 200 located in the 3G network corresponding to the effective network.

In other words, for network switching transmission of the second partial data, the terminal device 100 is configured to insert, into the second partial data as well as the virtual network access information, its own first network access information corresponding to the corresponding first network (i.e., 3G network), access information of the management device 400 corresponding to the corresponding first network, that is, access information of the management device 400 for the access to the 3G network, and access information of the external device 500 corresponding to the final destination. That is, the terminal device 100 (i.e., configured or functioning as a transmission device) replaces the network access information of the management device 400 (i.e., configured or functioning as the reception device) corresponding to the second network (i.e., assumed to be identified as a problem occurrence network) previously inserted into the second partial data with the network access information of the management device 400 corresponding to the first network (i.e., assumed to be identified as an effective network) inserted into the first partial data.

Meanwhile, in order to achieve the same condition as that before the WiFi network problem occurrence is identified, the terminal device 100 is configured to insert its own first network access information corresponding to the corresponding first network, access information of the management device 400 corresponding to the corresponding first network, that is, access information of the management device 400 for the access to the 3G network, and access information of the external device 500 corresponding to the final destination into the first partial data as well as the virtual network access information.

That is, according to the identification of the problem occurrence of the WiFi network, the terminal device 100 changes the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then applies the changed relative usage rate.

Further, the terminal device 100 is configured to transmit both the first partial data and the second partial data to the first network device 200 over the first network located in the 3G network, and the first network device 200 is configured to transmit both the first partial data and the second partial data to the management device 400 corresponding to the reception device over the first network.

The management device 400 is configured to receive the first partial data from the first network device 200 and the second partial data from the second network device 300, and reconstitute (or reconstruct) the data to be transmitted which the terminal device 100 desires to transmit by combining the first partial data and the second partial data based on the virtual network access information included in the received first partial data and second partial data to reconstitute (or generate) the data.

That is, the management device 400 can reconstitute (or generate) the original data to be transmitted by recognizing the first partial data and the second partial data having the same virtual network access information based on the virtual network access information included in the received several partial data and mixing and/or combining the first partial data and the second partial data according to order information included in the corresponding partial data.

Further, the management device 400 is configured to transmit the reconstituted (or reconstructed) data to be transmitted to the external device 500 by using the access information of the external device corresponding to the final destination recognized through at least one partial data of the first partial data and the second partial data.

As described above, the first partial data and second partial data divided by the terminal device 100 are combined and reconstituted as the original data to be transmitted by the management device 400 during the process in which the first partial data and the second partial data pass through the management device 400 through the heterogeneous networks, and the reconstituted data is transmitted to the external device 500 corresponding to the final destination.

Meanwhile, in the case where the management device 400 uses the simultaneous data transmission service with the terminal device 100, when the management device 400 receives notification of the problem occurrence of the WiFi network from the terminal device 100, the management device 400 is configured to receive both the first partial data and the second partial data through the 3G network corresponding to the effective network.

That is, when the problem occurrence of the WiFi network is identified, the management device 400 receives the notification of the problem occurrence of the WiFi network from the terminal device 100 through the first network device 200 located in the 3G network corresponding to the effective network and receives the second partial data transmitted through the second network device 300 on the WiFi network through the first network device 200 located in the 3G network corresponding to the effective network.

The management device 400 is configured to reconstitute (or generate) the data by combining the first partial data and the second partial data based on the virtual network access information included in the received first partial data and second partial data.

That is, the management device 400 is configured to reconstitute (or reconstruct) the data to be transmitted which the terminal device 100 desires to transmit by combining the first partial data and the second partial data based on the virtual network access information included respectively in the first partial data and the second partial data received from the first network device 200 to reconstitute (or generate) the data.

In other words, the management device 400 can reconstitute (or generate) the original data to be transmitted by recognizing the first partial data and the second partial data having the same virtual network access information based on the virtual network access information included in the received several partial data and mixing and/or combining the first partial data and the second partial data according to order information included in the corresponding partial data.

Next, the following description will be made based on a downlink process in which the management device 400 transmits the data to the terminal device 100 in the simultaneous data transmission service process between the terminal device 100 and the management device 400.

The management device 400 is configured to divide the data which is requested to be transmitted to the terminal device 100 from the external device 500 into partial data to use the simultaneous data transmission service.

That is, the management device 400 is configured to divide the data to be transmitted into partial data corresponding to the number of networks for the simultaneous data transmission using the heterogeneous network environment, that is, the 3G network and the WiFi network, and the division process may be performed according to a network selection policy transmitted from the policy management device 600.

In other words, the management device 400 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Further, the management device 400 is configured to identify the access information for at least one network corresponding to the terminal device 100 which is the final destination of the current data transmission and the virtual network access information based on the pre-managed table information for each subscriber. For example, the management device 400 can identify the first network and second network access information corresponding to the terminal device 100 and the virtual network access information based on the table information for each subscriber.

Further, the management device 400 is configured to insert the virtual network access information into the first partial data and insert the virtual network access information into the second partial data.

Of course, the management device 400 may insert its own first network access information corresponding to the corresponding first network, access information of the terminal device 100 corresponding to the corresponding first network, and access information of the external device 500 corresponding to an initial originator into the first partial data as well as the virtual network access information.

Further, the management device 400 may insert its own second network access information corresponding to the corresponding second network, access information of the terminal device 100 corresponding to the corresponding second network, and access information of the external device 500 corresponding to the initial originator into the second partial data as well as the virtual network access information.

Thereafter, the management device 400 is configured to transmit the first partial data to the first network device 200 located in the 3G network, and the first network device 200 is configured to transmit the first partial data to the terminal device 100 corresponding to the reception device. Further, the management device 400 is configured to transmit the second partial data to the second network device 300 located in the WiFi network, and the second network device 300 is configured to transmit the second partial data to the terminal device 100 corresponding to the reception device.

As described above, the data transmitted from the external device 500 is divided during the process in which the data passes through the management device 400, and the first partial data divided by the management device 400 is transmitted to the terminal device 100 via the 3G network and the divided second partial data is transmitted to the terminal device 100 via the WiFi network.

Meanwhile, when the management device 400 uses the simultaneous data transmission service with the terminal device 100, the management device 400 is configured to identify problem occurrence of a particular network of the heterogeneous networks through monitoring the 3G network and the WiFi network.

That is, during the process in which the management device 400 transmits the first partial data to the terminal device 100 through the first network device 200 located in the 3G network and transmits the second partial data to the terminal device 100 through the second network device 300 located in the WiFi network, the management device 400 is configured to identify the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

The management device 400 switches the WiFi network to the 3G network corresponding to the effective network to transmit the second partial data transmitted through the WiFi network through the 3G network.

That is, when the problem occurrence of the WiFi network is identified through monitoring method, the management device 400 notifies the problem occurrence of the WiFi network to the terminal device 100 through the first network device 200 located in the 3G network corresponding to an effective network and transmits the second partial data transmitted through the second network device 300 on the WiFi network through the first network device 200 located in the 3G network corresponding to the effective network.

In other words, for network switching transmission of the second partial data, the management device 400 is configured to insert its own first network access information corresponding to the corresponding first network, access information of the terminal device 100 corresponding to the corresponding first network, that is, access information of the management device 400 for the access to the 3G network, and access information of the external device 500 corresponding to a final originator into the second partial data as well as the virtual network access information. That is, the management device 400 (i.e., configured or functioning as a transmission device) replaces the network access information of the terminal device 100 (i.e., configured or functioning as the reception device) corresponding to the second network (i.e., assumed to be identified as a problem occurrence network) previously inserted into the second partial data with the network access information of the terminal device 100 corresponding to the first network (i.e., assumed to be identified as an effective network) inserted into the first partial data.

Meanwhile, in order to achieve the same condition as that before the WiFi network problem occurrence is identified, the management device 400 is configured to insert its own first network access information corresponding to the corresponding first network, access information of the terminal device 100 corresponding to the corresponding first network, that is, access information of the terminal device 100 for the access to the 3G network, and access information of the external device 500 corresponding to the final destination into the first partial data as well as the virtual network access information.

That is, according to the identification of the problem occurrence of the WiFi network, the management device 400 is configured to change the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then apply the changed relative usage rate.

Further, the management device 400 is configured to transmit both the first partial data and the second partial data to the first network device 200 located in the 3G network, and the first network device 200 is configured to transmit the first partial data and the second partial data to the terminal device 100 corresponding to the reception device.

The terminal device 100 is configured to receive the first partial data from the first network device 200 and second partial data from the second network device 300, and reconstitute (or reconstruct) the data to be transmitted which the management device 400 desires to transmit by combining the first partial data and the second partial data according to particular virtual network access information based on the virtual network access information included in the received first partial data and second partial data to reconstitute (or generate) the data.

That is, the terminal device 100 can reconstitute (or generate) the original data to be transmitted by recognizing the first partial data and the second partial data having pre-allocated virtual network access information based on the virtual network access information included in the received several partial data, recognizing the first partial data and the second partial data from the same external device 500 by identifying the access information, that is, the access information of the external device 500 corresponding to the initial originator and mixing/combining the first partial data and the second partial data according to order information included in the corresponding partial data.

As described above, the first partial data and the second partial data divided by the management device 400 are transmitted to the terminal device 100 through the heterogeneous networks, and the transmitted first partial data and second partial data are combined by the terminal device 100 and then reconstituted as the original data to be transmitted.

Meanwhile, in the case where the terminal device 100 uses the simultaneous data transmission service with the management device 400, when the terminal device 100 receives notification of problem occurrence of the WiFi network from the management device 400, the terminal device 100 is configured to receive both the first partial data and second partial data through the 3G network corresponding to the effective network.

That is, when the problem occurrence of the WiFi network is identified, the terminal device 100 receives the notification of the problem occurrence of the WiFi network from the management device 400 through the first network device 200 located in the 3G network corresponding to the effective network and receives the second partial data transmitted through the second network device 300 on the WiFi network through the first network device 200 located in the 3G network corresponding to the effective network.

The terminal device 100 is configured to reconstitute (or generate) the data by combining the first partial data and the second partial data based on the virtual network access information included in the received first partial data and second partial data.

That is, the terminal device 100 is configured to reconstruct the data to be transmitted which the management device 400 desires to transmit by combining the first partial data and the second partial data based on the virtual network access information included in the first partial data and the second partial data received from the first network device 200 to reconstitute (or generate) the data.

In other words, the terminal device 100 can reconstitute (or generate) the original data to be transmitted by recognizing the first partial data and the second partial data having the same virtual network access information based on the virtual network access information included in the received several partial data and mixing/combining the first partial data and the second partial data according to order information included in the corresponding partial data. In some embodiments, the terminal device 100, the first network device 200, the second network device 300, the management device 400, the external device 500 and/or the policy management device 600 include(s) one or more network interfaces including, but not limited to, cellular, Wi-Fi, LAN, WAN, CDMA, WCDMA, GSM, LTE and EPC networks, and cloud computing networks. Each of the terminal device 100, the first network device 200, the second network device 300, the management device 400, the external device 500 and/or the policy management device 600 is implemented by one or more processors and/or application-specific integrated circuits (ASICs).

Figure 2:
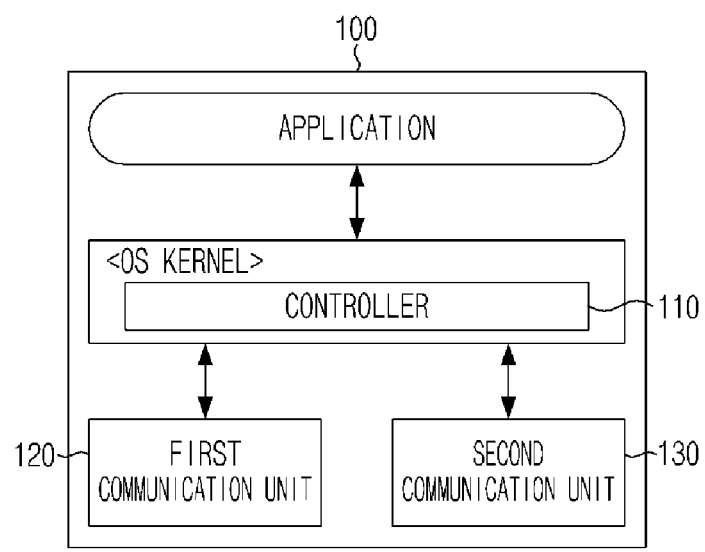
FIG. 2 is a schematic block diagram of a terminal device according to at least one embodiment of the present disclosure.

Hereinafter, the terminal device 100 as the transmission device which performs an uplink operation according to at least one embodiment of the present disclosure will be described with reference to FIG. 2 in more detail.

The terminal device 100 as the transmission device according to the present disclosure includes a controller 110 configured to divide data into partial data and inserting particular virtual network access information into each of the partial data, a first communication unit 120 configured to transmit first partial data to a first network, and a second communication unit 130 configured to transmit second partial data to a second network.

Here, the controller 110 may be mounted to an OS kernel installed in the terminal device 100, and perform a series of operations for a simultaneous data transmission service according to a request of a particular application installed in the terminal device 100 through the mounting or download.

Further, the first communication unit 120 refers to a communication module for interworking with the first network device 200 by using the 3G network, and the second communication unit 130 refers to a communication module for interworking with the second network device 300 by using the WiFi network.

The controller 110 is configured to divide data to be transmitted into partial data to use the simultaneous transmission service.

That is, the controller 110 is configured to divide the data to be transmitted into partial data corresponding to the number of networks for the simultaneous data transmission using a heterogeneous network environment, that is, the 3G network and the WiFi network, and the division process may be performed according to a network selection policy transmitted from the policy management device 600.

In other words, the controller 110 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 110 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Further, the controller 110 is configured to insert virtual network access information into the first partial data and insert virtual network access information into the second partial data.

Of course, the controller 110 may insert its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

Further, the controller 110 may insert its own second network access information corresponding to the corresponding second network, access information of the management device 400 corresponding to the corresponding second network, that is, access information of the management device 400 for the access to the WiFi network, and access information of the external device 500 corresponding to a final destination into the second partial data as well as the virtual network access information.

In addition, the controller 110 is configured to provide the first partial data and the second partial data to the first communication unit 120 and the second communication unit 130 to transmit the first partial data and the second partial data to the management device 400 through the 3G network and the WiFi network based on access information inserted into a header of each data.

That is, the controller 110 provides the first partial data to the first communication unit 120 to transmit the first partial data to the first network device 200 located in the 3G network, and then the first network device 200 transmits the first partial data to the management device 400 corresponding to the reception device. Further, the terminal device 100 provides the second partial data to the second communication unit 130 to transmit the second partial data to the second network device 300 located in the WiFi network, and then the second network device 300 transmits the second partial data to the management device 400 corresponding to the reception device.

As described above, the first partial data divided by the controller 110 is transmitted to the management device 400 via the 3G network, and the divided second partial data is transmitted to the management device 400 via the WiFi network.

Meanwhile, when the controller 110 uses the simultaneous data transmission service with the management device 400, the controller 110 is configured to identify problem occurrence of a particular network through monitoring the 3G network and the WiFi network.

That is, during the process in which the controller 110 transmits the first partial data to the management device 400 through the first network device 200 located in the 3G network and transmits the second partial data to the management device 400 through the second network device 300 located in the WiFi network, the controller 110 is configured to identify the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

The controller 110 switches the WiFi network to the 3G network corresponding to the effective network to transmit through the 3G network the second partial data transmitted through the WiFi network. That is, when the WiFi network is identified to be on the problem occurrence, the controller 110 controls the communication unit 120 to transmit over the effective network, the 3G network (i.e., a first network), and to the reception device (i.e., the management device 400), the second partial data intended to be transmitted through the WiFi network (i.e., a second network).

That is, when the problem occurrence of the WiFi network is identified through monitoring method, the controller 110 notifies the problem occurrence of the WiFi network to the management device 400 through the first network device 200 located in the 3G network corresponding to an effective network and transmits the second partial data transmitted through the second network device 300 on the WiFi network through the first network device 200 located in the 3G network corresponding to the effective network.

In other words, for network switching transmission of the second partial data, the controller 110 inserts its own first network access information corresponding to the corresponding first network, access information of the management device 400 corresponding to the corresponding first network, that is, access information of the management device 400 for the access to the 3G network, and access information of the external device 500 corresponding to a final destination into the second partial data as well as the virtual network access information. That is, the controller 110 of the terminal 100 replaces the network access information of the management device 400 (i.e., configured or functioning as the reception device) corresponding to the second network (i.e., assumed to be identified as a problem occurrence network) previously inserted into the second partial data with the network access information of the management device 400 corresponding to the first network (i.e., assumed to be identified as an effective network) inserted into the first partial data.

Meanwhile, in order to achieve the same condition as that before the WiFi network problem occurrence is identified, the controller 110 may insert its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

That is, according to the identification of the problem occurrence of the WiFi network, the controller 110 is configured to change the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then apply the changed relative usage rate.

Further, the controller 110 is configured to provide the first partial data and the second partial data to the first communication unit 120 to transmit the first partial data and the second partial data to the first network device 200 located in the 3G network, and then the first network device 200 is configured to transmit the first partial data and the second partial data to the management device 400 as the reception device.

Hereinafter, a more detailed configuration of the terminal device 100 which performs a downlink operation according to at least one embodiment of the present disclosure will be described with reference to FIG. 2.

That is, the terminal device 100 as the reception device according to the present disclosure includes the controller 110 configured to combine partial data to reconstitute (or reconstruct) original data, the first communication unit 120 configured to receive first partial data corresponding to a part of the partial data divided from the data, and the second communication unit 130 configured to receive second partial data corresponding to another part of the partial data. In this case, the first partial data and the second partial data received by the terminal device 100 may be the partial data transmitted and provided from the management device 400 corresponding to the transmission device.

Here, the controller 110 may be mounted to an OS kernel installed in the terminal device 100, and the controller 110 may reconstitute (or reconstruct) the partial data transmitted from the management device 400, and provide the reconstituted data to a particular application installed in the terminal device 100 through the mounting or download.

Further, the first communication unit 120 refers to a communication module for interworking with the first network device 200 by using the 3G network, and the second communication unit 130 refers to a communication module for interworking with the second network device 300 by using the WiFi network.

The controller 110 is configured to receive the first partial and second partial data transmitted from the management device 400.

That is, through a communication route formed according to access information inserted into the first partial data and the second partial data, the controller 110 receives the first partial data transmitted via the first network device 200 located in the 3G network through the first communication unit 120 and receives the second partial data transmitted via the second network device 300 located in the WiFi network through the second communication unit 130.

The controller 110 is configured to reconstitute (or reconstruct) the data to be transmitted which the management device 400 desires to transmit by combining the first partial data and the second partial data according to particular virtual network access information based on the virtual network access information included in the received first partial data and second partial data to reconstitute (or generate) the data.

That is, the controller 110 can reconstitute (or generate) the original data to be transmitted by recognizing the first partial data and the second partial data having pre-allocated virtual network access information based on the virtual network access information included in the received several partial data, recognizing the first partial data and the second partial data from the same external device 500 by identifying the access information corresponding to an initial originator, that is, the access information of the external device 500, and mixing/combining the first partial data and the second partial data according to order information included in the corresponding partial data.

As described above, the first partial data and the second partial data divided by the management device 400 are transmitted to the terminal device 100 through the heterogeneous networks, and the transmitted first partial data and second partial data are combined by the terminal device 100 and then reconstituted as the original data to be transmitted.

Meanwhile, in the case where the controller 110 uses the simultaneous data transmission service with the management device 400, when the controller 110 receives notification of the problem occurrence of the WiFi network from the management device 400, the controller 110 is configured to receive both the first partial data and the second partial data through the 3G network corresponding to the effective network.

That is, when problem occurrence of the WiFi network is identified, the controller 110 receives the notification of the problem occurrence of the WiFi network from the management device 400 through the first network device 200 located in the 3G network corresponding to the effective network, and receives the second partial data transmitted through the second network device 300 on the WiFi network through the first network device 200 located in the 3G network corresponding to the effective network.

The controller 100 is configured to reconstitute (or generate) the data by combining the first partial data and the second partial data based on the virtual network access information included in the received first partial data and second partial data.

That is, the controller 110 is configured to reconstitute (or reconstruct) the data to be transmitted which the management device 400 desires to transmit by combining the first partial data and the second partial data based on the virtual network access information included in the first partial data and the second partial data received from the first network device 200 to reconstitute (or generate) the data.

In other words, the controller 110 can reconstitute (or generate) the original data to be transmitted by recognizing the first partial data and the second partial data having the same virtual network access information based on the virtual network access information included in the received several partial data and mixing/combining the first partial data and the second partial data according to order information included in the corresponding partial data.

Figure 3:
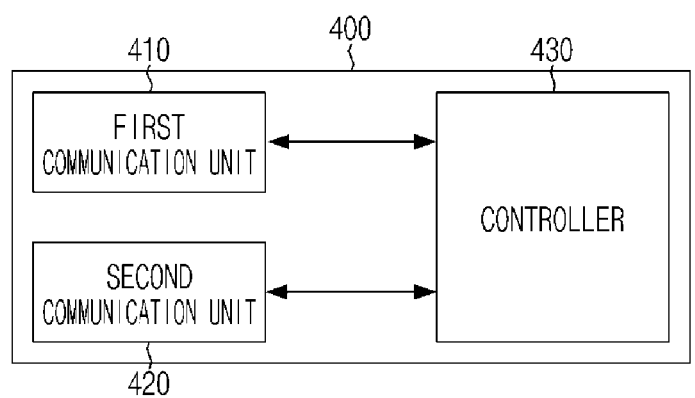
FIG. 3 is a schematic block diagram of a management device according to at least one embodiment of the present disclosure.

Hereinafter, the management device 400 corresponding to the reception device for performing an uplink operation according to at least one embodiment of the present disclosure will be described with reference to FIG. 3 in more detail.

That is, the management device 400 corresponding to the reception device according to the present disclosure includes a first communication unit 410 configured to receive first partial data corresponding to a part of the partial data divided from the data, a second communication unit 420 configured to receive second partial data corresponding to another part of the divided partial data, and a controller 430 for reconstituting (or generating) the data by combining the first partial data and the second partial data according to particular virtual network access information based on the virtual network access information included in the received first partial data and second partial data. In this case, the received first partial data and second partial data may be the partial data transmitted or provided from the terminal device 100 corresponding to the transmission device.

The first communication unit 410 refers to a communication module for interworking with the first network device 200 by using the 3G network, and the second communication unit 420 refers to a communication module for interworking with the second network device 300 by using the WiFi network.

The controller 430 is configured to receive the first partial data and the second partial data transmitted from the terminal device 100.

That is, through transmission paths through which the first partial data and the second partial data pass according to the access information included in the headers of the first partial data and the second partial data, the controller 430 receives the first partial data transmitted via the first network device 200 located in the 3G network through the first communication unit 410, and receives the second partial data transmitted via the second network device 300 located in the WiFi network through the second communication unit 420.

The controller 430 is configured to reconstitute (or reconstruct) the data to be transmitted which the terminal device 100 desires to transmit by combining the first partial data and the second partial data based on the virtual network access information included in the received first partial data and second partial data to reconstitute (or generate) the data.

That is, the controller 430 can reconstitute (or generate) the original data to be transmitted by recognizing the first partial data and the second partial data having the same virtual network access information based on the virtual network access information included in the received several partial data and mixing and/or combining the first partial data and the second partial data according to order information included in the corresponding partial data.

Further, the controller 430 is configured to transmit the reconstituted data to be transmitted to the external device 500 by using access information of the external device corresponding to a final destination recognized through at least one partial data of the first partial data and the second partial data.

As described above, during the process in which the first partial data and the second partial data divided by the terminal device 100 pass through the management device 400 through the heterogeneous networks, the first partial data and the second partial data are combined by the management device 400 to be reconstituted as the original data to be transmitted, and then the reconstituted data to be transmitted is transmitted to the external device 500 corresponding to the final destination.

Meanwhile, in a case where the controller 430 uses the simultaneous data transmission service with the terminal device 100, when the controller 430 receives the notification of the problem occurrence of the WiFi network from the terminal device 100, the controller 430 is configured to receive both the first partial data and the second partial data through the 3G network corresponding to the effective network.

That is, when the problem occurrence of the WiFi network is identified, the controller 430 receives the notification of the problem occurrence of the WiFi network from the terminal device 100 through the first network device 200 located in the 3G network corresponding to the effective network and receives the second partial data transmitted through the second network device 300 on the WiFi network through the first network device 200 located in the 3G network corresponding to the effective network.

The controller 430 is configured to reconstitute (or generate) the data by combining the first partial data and the second partial data based on the virtual network access information included in the received first partial data and second partial data.

That is, the controller 430 is configured to reconstitute (or reconstruct) the data to be transmitted which the terminal device 100 desires to transmit by combining the first partial data and the second partial data based on the virtual network access information included in the first partial data and the second partial data received from the first network device 200 to reconstitute (or generate) the data.

In other words, the controller 430 can reconstitute (or generate) the original data to be transmitted by recognizing the first partial data and the second partial data having the same virtual network access information based on the virtual network access information included in the received several partial data, and mixing/combining the first partial data and the second partial data according to order information included in the corresponding partial data.

Meanwhile, the controller 430 is configured to transmit the reconstituted data to be transmitted to the external device 500 by using the access information of the external device corresponding to the final destination recognized through at least one partial data of the first partial data and the second partial data in step S150.

That is, the first partial data and second partial data divided by the terminal device 100 are combined by the management device 400 to be reconstituted as the original data to be transmitted during the process in which the first partial data and second partial data pass through the management device 400 through the heterogeneous networks, and then the reconstituted data to be transmitted is transmitted to the external device 500 corresponding to the final destination.

Hereinafter, the management device 400 corresponding to the transmission device for performing a downlink operation according to at least one embodiment of the present disclosure will be described with reference to FIG. 3 in more detail.

That is, the management device 400 corresponding to the transmission device according to the present disclosure divides the data into partial data, and includes the controller 430 configured to insert particular virtual network access information into each partial data, the first communication unit 410 configured to transmit first partial data to the first network, and the second communication unit 420 configured to transmit second partial data to the second network.

The controller 430 is configured to divide the data which is requested to be transmitted to the terminal device 100 from the external device 500 into the partial data to use the simultaneous transmission service.

That is, the controller 430 is configured to divide the data to be transmitted into partial data corresponding to the number of networks for the simultaneous data transmission using the heterogeneous network environment, that is, the 3G network and the WiFi network, and the division process may be performed according to the network selection policy transmitted from the policy management device 600.

In other words, the controller 430 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and each of the traffic distribution rate for each network changed in real time, the controller 430 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Further, the controller 430 is configured to identify the access information for each network corresponding to the terminal device 100 which is the final destination of the current data transmission and the virtual network access information based on the pre-managed table information for each subscriber. For example, the controller 430 can identify the first network and second network access information corresponding to the terminal device 100 and the virtual network access information based on the table information for each subscriber.

Further, the controller 430 is configured to insert the virtual network access information into the first partial data, and insert the virtual network access information into the second partial data.

That is, the controller 430 may insert its own first network access information corresponding to the corresponding first network, access information of the terminal device 100 corresponding to the corresponding first network, and access information of the external device 500 corresponding to the initial originator into the first partial data as well as the virtual network access information.

Further, the controller 430 may insert its own second network access information corresponding to the corresponding second network, access information of the terminal device 100 corresponding to the corresponding second network, and access information of the external device 500 corresponding to the initial originator into the second partial data as well as the virtual network access information.

In addition, the controller 430 is configured to provide the first partial data and the second partial data to the first communication unit 410 and the second communication unit 430 to transmit the first partial data and the second partial data to the terminal device 100 through the 3G network and the WiFi network based on the access information inserted into the header of each data.

That is, the controller 430 provides the first partial data to the first communication unit 410 to transmit the first partial data to the first network device 200 located in the 3G network, and then the first network device 200 transmits the first partial data to the management device 400 corresponding to the reception device. Further, the controller 430 provides the second partial data to the second communication unit 420 to transmit the second partial data to the second network device 300 located in the WiFi network, and then the second network device 300 transmits the divided second partial data to the management device 400 corresponding to the reception device.

As described above, the first partial data divided by the controller 430 is transmitted to the terminal device 100 via the 3G network, and the second partial data is transmitted to the terminal device 100 via the WiFi network.

Meanwhile, when the controller 430 uses the simultaneous data transmission service with the terminal device 100, the controller 430 is configured to identify problem occurrence of a particular network through monitoring the 3G network and the WiFi network.

That is, during the process in which the controller 430 transmits the first partial data to the management device 400 through first network device 200 located in the 3G network and transmits the second partial data to the management device 400 through the second network device 300 located in the WiFi network, the controller 430 identifies the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

The controller 110 switches the WiFi network to the 3G network corresponding to the effective network to transmit the second partial data transmitted through the WiFi network through the 3G network.

That is, when the problem occurrence of the WiFi network is identified through the monitoring method, the controller 430 notifies the problem occurrence of the WiFi network to the terminal device 100 through the first network device 200 located in the 3G network corresponding to an effective network and transmits the second partial data transmitted through the second network device 300 on the WiFi network through the first network device 200 located in the 3G network corresponding to the effective network.

In other words, for network switching transmission of the second partial data, the controller 430 is configured to insert its own first network access information corresponding to the corresponding first network, access information of the terminal device 100 corresponding to the corresponding first network, that is, access information of the management device 400 for the access to the 3G network, and access information of the external device 500 corresponding to a final originator into the second partial data as well as the virtual network access information.

Meanwhile, in order to achieve the same condition as that before the WiFi network problem occurrence is identified, the controller 430 may insert its own first network access information corresponding to the corresponding first network, access information of the terminal device 100 corresponding to the corresponding first network, that is, access information of the terminal device 100 for the access to the 3G network, and access information of the external device 500 corresponding to the final destination into the first partial data as well as the virtual network access information.

That is, according to the identification of the problem occurrence of the WiFi network, the controller 430 may change the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then apply the changed relative usage rate.

Further, the controller 430 provides the first partial data and the second partial data to the first communication unit 410 to transmit both the first partial data and the second partial data to the first network device 200 located in the 3G network, and then the first network device 200 transmits the first partial data and the second partial data to the terminal device 100 as the reception device.

According to the heterogeneous network based-simultaneous data transmission service system according to the present disclosure, at the time of dividing data to be transmitted and simultaneously transmitting the divided data in a heterogeneous network environment, virtual network access information for achieving simultaneous link transmission through heterogeneous networks is managed after being additionally allocated to each terminal, so as to increase a data transmission speed and enable data transmission/reception through an effective network based on the virtual network access information and thus guarantee the service continuity even when a particular network is disconnected, thereby implementing an efficient and a highly reliable heterogeneous network based-simultaneous data transmission service.

Hereinafter, a method for providing a heterogeneous network based-simultaneous data transmission service according to at least one embodiment of the present disclosure will be described with reference to FIGS. 4 to 9. Here, configurations the same as those illustrated in FIGS. 1 to 3 will be described by using the corresponding reference numerals for convenience of the description.

Figure 4:
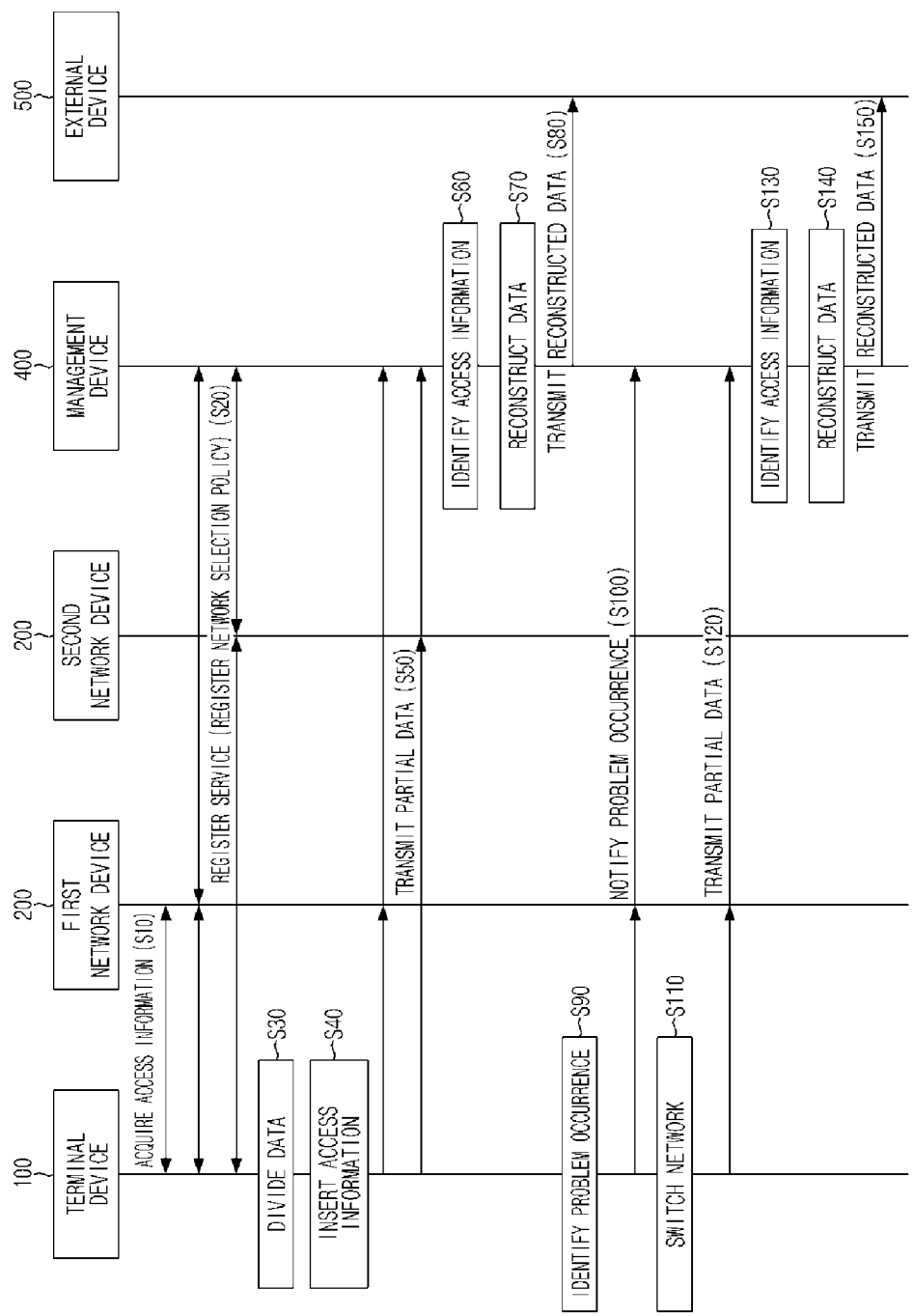
FIG. 4 is a flowchart of an uplink operation method of a heterogeneous network based-simultaneous data transmission service system according to at least one embodiment of the present disclosure.

First, the method for providing a heterogeneous network based-simultaneous data transmission service according to at least one embodiment of the present disclosure will be described with reference to FIG. 4.

First, the terminal device 100 acquires access information to use the simultaneous data transmission service in the heterogeneous network environment in step S10.

The terminal device 100 receives first network access information (for example, a 3G IP) from the first network device 200 according to a conventional access information allocation method by registering a position of the 3G network, and makes a request for access information of the management device 400 for the access to the 3G network to the first network device 200. Further, the terminal device 100 receives second network access information (for example, a WiFi IP) from the second network device 300 according to a conventional access information allocation method by accessing the WiFi network.

In addition, the terminal device 100 accesses the management device 400 through the heterogeneous networks to make a request for the service registration in step S20.

The terminal device 100 is allocated and possesses separate virtual network access information for the heterogeneous network based-simultaneous data transmission service according to the present disclosure and the allocation of the separate virtual network access information can be managed by the management device 400.

The terminal device 100 can receive the virtual network access information allocated by the management device 400 during the service registration process through the 3G network or the WiFi network, generate (and/or possess) the virtual network access information by itself based on pre-possessed device identification information (for example, MDN, IMSI, IMEI and the like), or use (and/or possess) pre-allocated network access information as the virtual network access information.

Further, the management device 400 can manage the table information for each subscriber including the first network and second network access information mapped based on the device identification information of the terminal device which has been service-registered for each subscriber, the virtual network access information (for example, the virtual IP), and service classification information (initial, update, and remove) based on additional information included in the service registration request of the terminal device 100 received through each of the 3G network and the WiFi network.

Then, the terminal device 100 divides the data to be transmitted into partial data to use the simultaneous data transmission service in step S30.

The terminal device 100 divides the data to be transmitted into partial data corresponding to the number of networks for the simultaneous data transmission using the heterogeneous network environment, that is, the 3G network and the WiFi network, and the division process may be performed according to the network selection policy transmitted from the policy management device 600.

In other words, the terminal device 100 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the terminal device 100 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Further, the terminal device 100 inserts the virtual network access information into the first partial data and inserts the virtual network access information into the second partial data in step S40.

The terminal device 100 inserts its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

Further, the terminal device 100 inserts its own second network access information corresponding to the corresponding second network, access information of the management device 400 corresponding to the corresponding second network, that is, access information of the management device 400 for the access to the WiFi network, and access information of the external device 500 corresponding to a final destination into the second partial data as well as the virtual network access information.

Then, the terminal device 100 provides the first partial data and the second partial data through the 3G network and the WiFi network in step S50.

The terminal device 100 transmits the first partial data to the first network device 200 located in the 3G network, and the first network device 200 transmits the first partial data to the management device 400 corresponding to the reception device. Further, the terminal device 100 transmits the second partial data to the second network device 300 located in the WiFi network, and the second network device 300 transmits the second partial data to the management device 400 corresponding to the reception device.

As described above, the first partial data divided by the terminal device 100 is transmitted to the management device 400 via the 3G network, and the divided second partial data is transmitted to the management device 400 via the WiFi network.

Then, the management device 400 receives the first partial data and the second partial data to reconstitute (or generate) the data in steps S60 to S70.

The management device 400 receives the first partial data from the first network device 200 and the second partial data from the second network device 300, and reconstitutes (or reconstructs) the data to be transmitted which the terminal device 100 desires to transmit by combining the first partial data and the second partial data based on the virtual network access information included in the received first partial data and second partial data to reconstitute (or generate) the data.

In other words, the management device 400 can reconstitute (or generate) the original data to be transmitted by recognizing the first partial data and the second partial data having the same virtual network access information based on the virtual network access information included in the received several partial data and mixing/combining the first partial data and the second partial data according to order information included in the corresponding partial data.

Further, the management device 400 transmits the reconstituted data to be transmitted to the external device 500 by using the access information of the external device corresponding to the final destination recognized through at least one partial data of the first partial data and the second partial data in step S80.

That is, the first partial data and second partial data divided by the terminal device 100 are combined by the management device 400 to be reconstituted as the original data to be transmitted during the process in which the first partial data and the second partial data pass through the management device 400 through the heterogeneous networks, and then the reconstituted data to be transmitted is transmitted to the external device 500 corresponding to the final destination.

Meanwhile, when the terminal device 100 uses the simultaneous data transmission service with the management device 400, the terminal device 100 identifies problem occurrence of the particular network through monitoring the 3G network and the WiFi network in step S90.

During the process in which the terminal device 100 transmits the first partial data to the management device 400 through first network device 200 located in the 3G network and transmits the second partial data to the management device 400 through the second network device 300 located in the WiFi network, the terminal device 100 identifies the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

Then, the terminal device 100 switches the WiFi network to the 3G network corresponding to the effective network to transmit the second partial data transmitted through the WiFi network through the 3G network in steps S100 to S120.

When the problem occurrence of the WiFi network is identified through the monitoring method, the terminal device 100 notifies the problem occurrence of the WiFi network to the management device 400 through the first network device 200 located in the 3G network corresponding to an effective network and transmits the second partial data transmitted through the second network device 300 on the WiFi network through the first network device 200 located in the 3G network corresponding to the effective network.

In other words, for network switching transmission of the second partial data, the terminal device 100 inserts its own first network access information corresponding to the corresponding first network, access information of the management device 400 corresponding to the corresponding first network, that is, access information of the management device 400 for the access to the 3G network, and access information of the external device 500 corresponding to the final destination into the second partial data as well as the virtual network access information.

Meanwhile, in order to achieve the same condition as that before the WiFi network problem occurrence is identified, the terminal device 100 inserts its own first network access information corresponding to the corresponding first network, access information of the management device 400 corresponding to the corresponding first network, that is, access information of the management device 400 for the access to the 3G network, and access information of the external device 500 corresponding to the final destination into the first partial data as well as the virtual network access information.

That is, according to the identification of the problem occurrence of the WiFi network, the terminal device 100 changes the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then applies the changed relative usage rate.

Then, the terminal device 100 transmits the first partial data and the second partial data to the first network device 200 located in the 3G network, and the first network device 200 transmits the first partial data and the second partial data to the management device 400 corresponding to the reception device.

When problem occurrence of the WiFi network is identified, the management device 400 receives notification of problem occurrence of the WiFi network from the terminal device 100 through the first network device 200 located in the 3G network corresponding to the effective network, and receives the second partial data transmitted through the second network device 300 on the WiFi network through the first network device 200 located in the 3G network corresponding to the effective network.

Further, the management device 400 reconstitutes (or generates) the data by combining the first partial data and the second partial data based on the virtual network access information included in the received first partial data and second partial data in steps S130 to S140.

The management device 400 reconstitutes (or reconstructs) the data to be transmitted which the terminal device 100 desires to transmit by combining the first partial data and the second partial data based on the virtual network access information included in the first partial data and the second partial data received from the first network device 200 to reconstitute (or generate) the data.

In other words, the management device 400 can reconstitute (or generate) the original data to be transmitted by recognizing the first partial data and the second partial data having the same virtual network access information based on the virtual network access information included in the received several partial data, and mixing/combining the first partial data and the second partial data according to order information included in the corresponding partial data.

Thereafter, the management device 400 transmits the reconstituted data to be transmitted to the external device 500 by using the access information of the external device corresponding to the final destination recognized through at least one partial data of the first partial data and the second partial data in step S150.

That is, during the process in which the first partial data and the second partial data divided by the terminal device 100 pass through the management device 400 through the heterogeneous networks, the first partial data and the second partial data are combined by the management device 400 to be reconstituted as the original data to be transmitted, and then the reconstituted data to be transmitted is transmitted to the external device 500 corresponding to the final destination.

Figure 5:
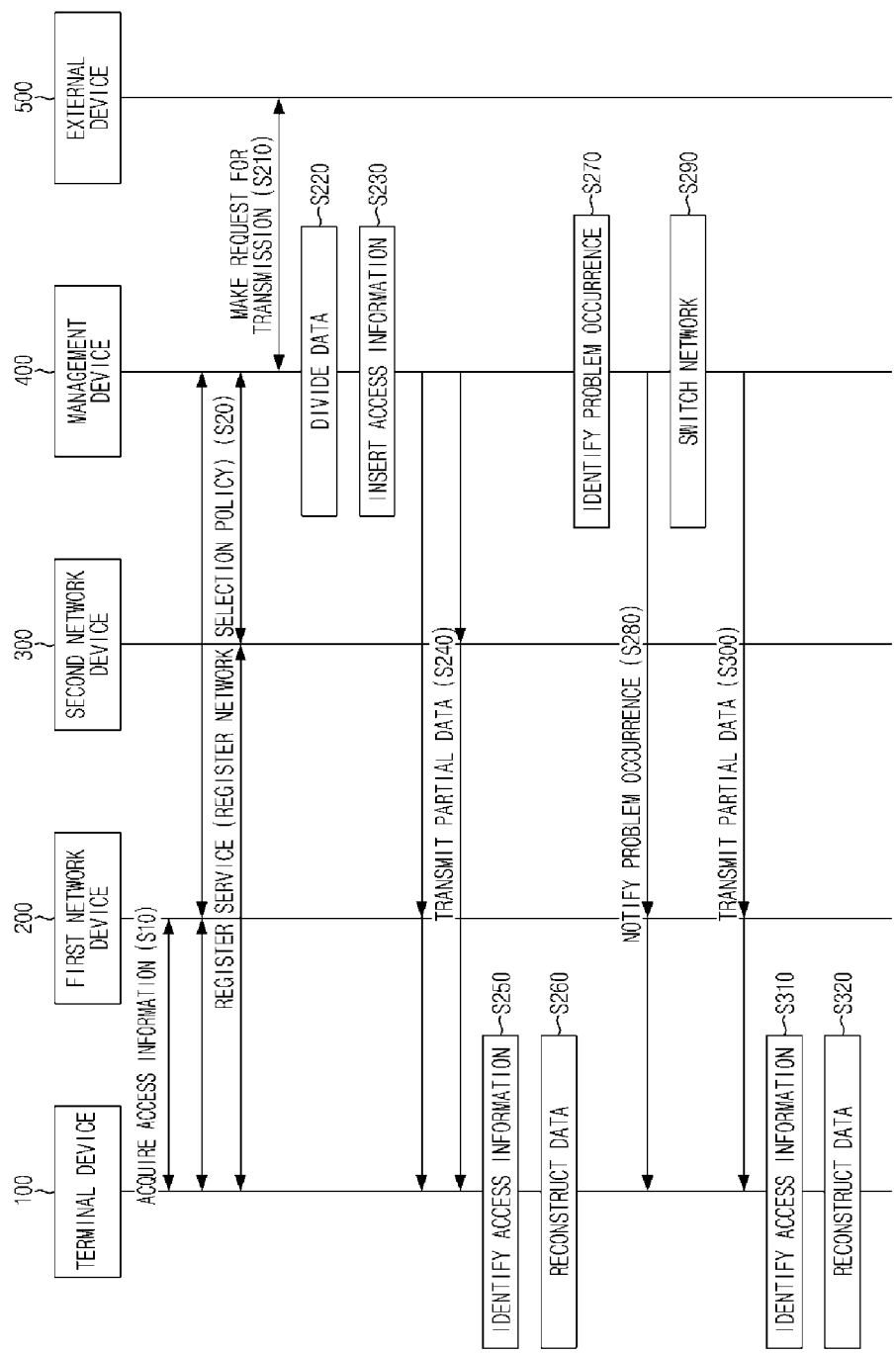
FIG. 5 is a flowchart of a downlink operation method of a heterogeneous network based-simultaneous data transmission service system according to at least one embodiment of the present disclosure.

Hereinafter, a downlink operation method of the heterogeneous network based-simultaneous data transmission service system according to at least one embodiment of the present disclosure will be described with reference to FIG. 5. Meanwhile, since the process of acquiring the access information and registering the service between the terminal device 100 and management device 400 is the same as the uplink operation described with reference to FIG. 4, detailed descriptions thereof will be omitted.

First, the management device 400 divides the data which is requested to be transmitted to the terminal device 100 from the external device 500 into partial data to use the simultaneous data transmission service in steps S210 to S220.

The management device 400 divides the data to be transmitted into partial data corresponding to the number of networks for the simultaneous data transmission using the heterogeneous network environment, that is, the 3G network and the WiFi network, and the division process may be performed according to a network selection policy transmitted from the policy management device 600.

In other words, the management device 400 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the management device 400 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Then, the management device 400 inserts the virtual network access information into the first partial data and inserts the virtual network access information into the second partial data in step S230.

The management device 400 identifies access information for each network corresponding to the terminal device 100 which is the final destination of the current data transmission and virtual network access information based on the pre-managed table information for each subscriber. For example, the management device 400 can identify the first network and second network access information corresponding to the terminal device 100 and the virtual network access information based on the table information for each subscriber.

The management device 400 inserts its own first network access information corresponding to the corresponding first network, access information of the terminal device 100 corresponding to the corresponding first network, and access information of the external device 500 corresponding to the initial originator into the first partial data as well as the virtual network access information.

Further, the management device 400 inserts its own second network access information corresponding to the corresponding second network, access information of the terminal device 100 corresponding to the corresponding second network, and access information of the external device 500 corresponding to the initial originator into the second partial data as well as the virtual network access information.

Next, the terminal device 100 provides the first partial data and the second partial data through the 3G network and the WiFi network in step S240.

The management device 400 provides the first partial data to the first network device 200 located in the 3G network, and the first network device 200 transmits the first partial data to the terminal device 100 corresponding to the reception device. Further, the management device 400 transmits the second partial data to the second network device 300 located in the WiFi network, and the second network device 300 transmits the second partial data to the terminal device 100 corresponding to the reception device.

As described above, the data transmitted from the external device 500 is divided during the process in which the partial data passes through the management device 400. The first partial data divided by the management device 400 is transmitted to the terminal device 100 via the 3G network and the divided second partial data is transmitted to the terminal device 100 via the WiFi network.

Then, the terminal device 100 receives the first partial data and the second partial data to reconstitute (or generate) the data in steps S250 to S260.

The terminal device 100 receives the first partial data from the first network device 200 and second partial data from the second network device 300, and reconstitutes (or reconstructs) the data to be transmitted which the management device 400 desires to transmit by combining the first partial data and the second partial data according to particular virtual network access information based on the virtual network access information included in the received first partial data and second partial data to reconstitute (or generate) the data.

That is, the terminal device 100 can reconstitute (or generate) the original data to be transmitted by recognizing the first partial data and the second partial data having pre-allocated virtual network access information based on the virtual network access information included in the received several partial data, recognizing the first partial data and the second partial data from the same external device 500 by identifying the access information corresponding to an initial originator, that is, the access information of the external device 500, and mixing/combining the first partial data and the second partial data according to order information included in the corresponding partial data.

As described above, the first partial data and the second partial data divided by the management device 400 are transmitted to the terminal device 100 through the heterogeneous networks, and the transmitted first partial data and second partial data are combined by the terminal device 100 and then reconstituted as the original data to be transmitted.

Meanwhile, when the management device 400 uses the simultaneous data transmission service with the terminal device 100, the management device 400 identifies problem occurrence of the particular network through monitoring the 3G network and the WiFi network in step S270.

During the process in which the management device 400 transmits the first partial data to the terminal device 100 through the first network device 200 located in the 3G network and transmits the second partial data to the terminal device 100 through the second network device 300 located in the WiFi network, the management device 400 identifies the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

Then, the management device 400 switches the WiFi network to the 3G network corresponding to the effective network to transmit through the 3G network the second partial data transmitted through the WiFi network.

When the problem occurrence of the WiFi network is identified through monitoring method, the management device 400 notifies the problem occurrence of the WiFi network to the terminal device 100 through the first network device 200 located in the 3G network corresponding to the effective network and transmits the second partial data transmitted through the second network device 300 on the WiFi network through the first network device 200 located in the 3G network corresponding to the effective network.

In other words, for network switching transmission of the second partial data, the management device 400 inserts its own first network access information corresponding to the corresponding first network, access information of the terminal device 100 corresponding to the corresponding first network, that is, access information of the management device 400 for the access to the 3G network, and access information of the external device 500 corresponding to the final originator into the second partial data as well as the virtual network access information.

Meanwhile, in order to achieve the same condition as that before the WiFi network problem occurrence is identified, the management device 400 inserts its own first network access information corresponding to the corresponding first network, access information of the management device 400 corresponding to the corresponding first network, that is, access information of the terminal device 100 for the access to the 3G network, and access information of the external device 500 corresponding to a final destination into the first partial data as well as the virtual network access information.

That is, according to the identification of the problem occurrence of the WiFi network, the management device 400 changes the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then applies the changed relative usage rate.

Further, the management device 400 transmits the first partial data and the second partial data to the first network device 200 located in the 3G network, and then the first network device 200 transmits the first partial data and the second partial data to the terminal device 100 corresponding to the reception device.

When the problem occurrence of the WiFi network is identified, the terminal device 100 receives notification of the problem occurrence of the WiFi network from the management device 400 through the first network device 200 located in the 3G network corresponding to the effective network, and receives the second partial data transmitted through the second network device 300 on the WiFi network through the first network device 200 located in the 3G network corresponding to the effective network.

Thereafter, the terminal device 100 reconstitutes (or generates) the data by combining the first partial data and the second partial data based on the virtual network access information included in the received first partial data and second partial data in steps S310 to S320.

The terminal device 100 reconstitutes (or reconstructs) the data to be transmitted which the management device 400 desires to transmit by combining the first partial data and the second partial data based on the virtual network access information included in the first partial data and second partial data received from the first network device 200 to reconstitute (or generate the data.

In other words, the terminal device 100 can reconstitute (or generate the original data to be transmitted by recognizing the first partial data and the second partial data having the same virtual network access information based on the virtual network access information included in the received several partial data, and mixing/combining the first partial data and the second partial data according to order information included in the corresponding partial data.

Figure 6:
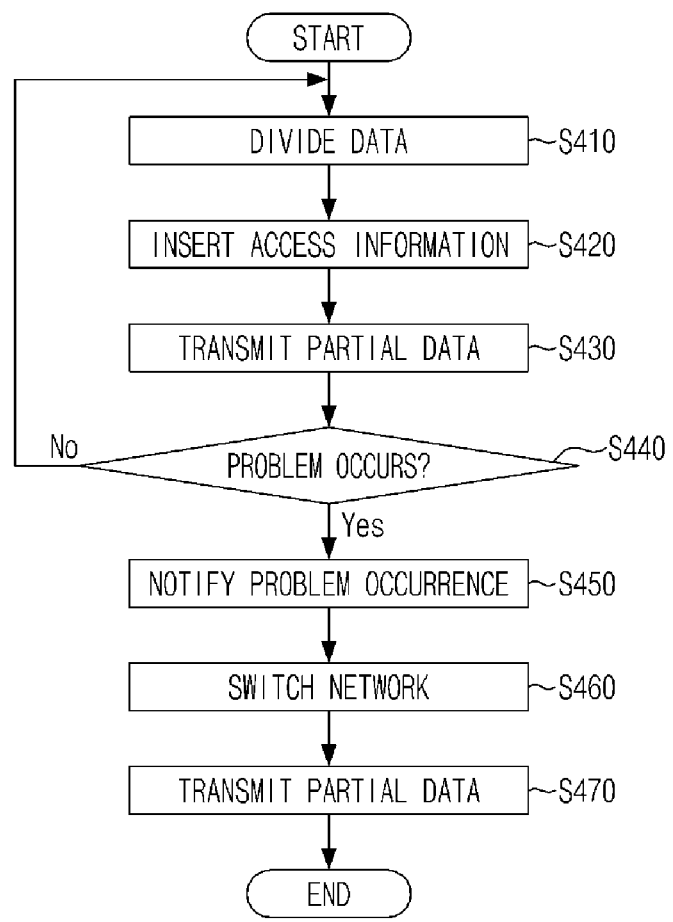
FIG. 6 is a flowchart of an uplink operation of a terminal device and a downlink operation of a management device according to at least one embodiment of the present disclosure.

Hereinafter, an operation method of the terminal device 100 corresponding to the transmission device for performing an uplink operation according to at least one embodiment of the present disclosure will be described with reference to FIG. 6.

First, data to be transmitted is divided into partial data to use the simultaneous data transmission service in step S410.

The controller 110 of the terminal device 100 divides the data to be transmitted into partial data corresponding to the number of networks for the simultaneous data transmission using the heterogeneous network environment, that is, the 3G network and the WiFi network, and the division process may be performed according to a network selection policy transmitted from the policy management device 600.

In other words, the controller 110 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 110 can apply relative usage rates of the 3G network and the WiFi network, for example, 10% of the 3G network and 90% of the WiFi network, 90% of the 3G network and 10% of the WiFi network, 50% of the 3G network and 50% of the WiFi network and the like.

Then, the virtual network access information is inserted into the first partial data and the virtual network access information is inserted into the second partial data in step S420.

The controller 110 inserts its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

Further, the controller 110 inserts its own second network access information corresponding to the corresponding second network, access information of the management device 400 corresponding to the corresponding second network, that is, access information of the management device 400 for the access to the WiFi network, and access information of the external device 500 corresponding to a final destination into the second partial data as well as the virtual network access information.

Then, the first partial data and the second partial data are provided to the first communication unit 120 and the second communication unit 130 to be transmitted to the management device 400 through the 3G network and the WiFi network based on access information inserted into the header of each data in step S430.

The controller 110 provides the first partial data to the first communication unit 120 to transmit the first partial data to the first network device 200 located in the 3G network, and then the first network device 200 transmits the first partial data to the management device 400 corresponding to the reception device. Further, the terminal device 100 provides the second partial data to the second communication unit 130 to transmit the second partial data to the second network device 300 located in the WiFi network, and then the second network device 300 transmits the second partial data to the management device 400 corresponding to the reception device.

As described above, the first partial data divided by the controller 110 is transmitted to the management device 400 via the 3G network, and the second partial data is transmitted to the management device 400 via the WiFi network.

Meanwhile, when the controller 110 uses the simultaneous data transmission service with the management device 400, the controller 110 identifies problem occurrence of a particular network through monitoring the 3G network and the WiFi network in step S440.

During the process in which the controller 110 transmits the first partial data to the management device 400 through first network device 200 located in the 3G network and transmits the second partial data to the management device 400 through the second network device 300 located in the WiFi network, the controller 110 identifies the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

Further, second partial data transmitted through the WiFi network is transmitted through the 3G network corresponding to the effective network by switching the WiFi network to the 3G network in steps S450 to S460.

When the problem occurrence of the WiFi network is identified through the monitoring method, the controller 110 notifies the problem occurrence of the WiFi network to the management device 400 through the first network device 200 located in the 3G network corresponding to the effective network and transmits the second partial data transmitted through the second network device 300 on the WiFi network through the first network device 200 located in the 3G network corresponding to the effective network.

In other words, for network switching transmission of the second partial data, the controller 110 inserts its own first network access information corresponding to the corresponding first network, access information of the management device 400 corresponding to the corresponding first network, that is, access information of the management device 400 for the access to the 3G network, and access information of the external device 500 corresponding to the final destination into the second partial data as well as the virtual network access information.

Meanwhile, in order to achieve the same condition as that before the WiFi network problem occurrence is identified, the controller 110 inserts its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

That is, according to the identification of the problem occurrence of the WiFi network, the controller 110 changes the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then applies the changed relative usage rate.

Thereafter, the first partial data and the second partial data are transmitted through the 3G network in step S470.

The controller 110 provides the first partial data and the second partial data to the first communication unit 120 to transmit the first partial data and the second partial data to the first network device 200 located in the 3G network, and the first network device 200 transmits the first partial data and the second partial data to the management device 400 corresponding to the reception device.

Figure 7:
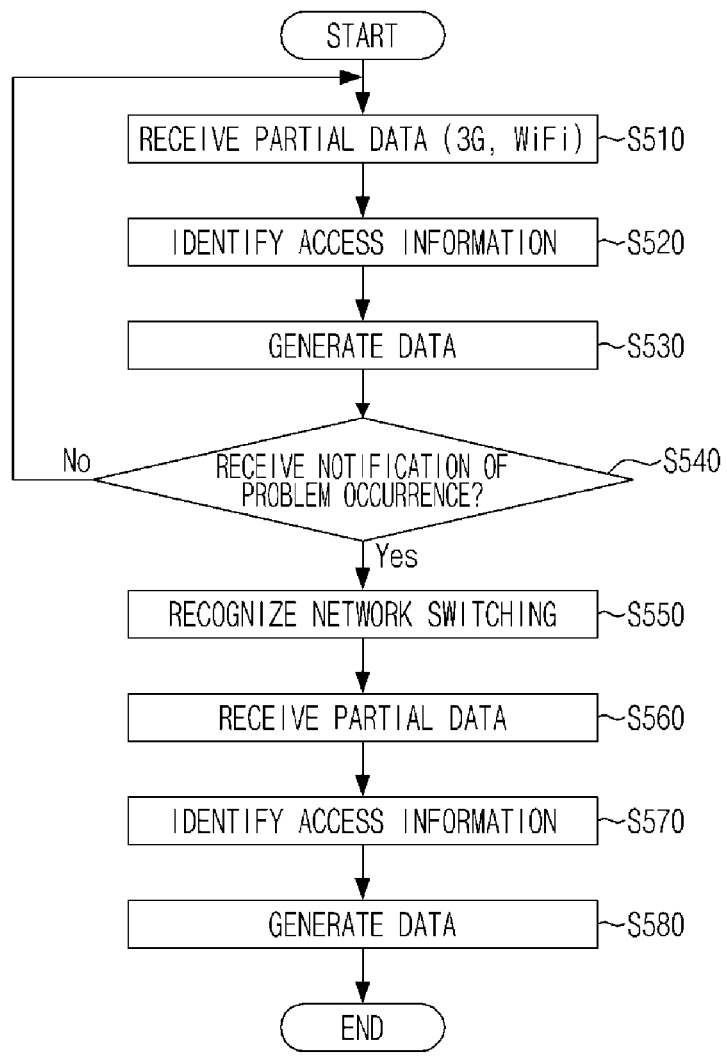
FIG. 7 is a flowchart of a downlink operation of a device terminal according to at least one embodiment of the present disclosure.

Hereinafter, an operation method of the terminal device 100 for performing a downlink operation as the reception device according to at least one embodiment of the present disclosure will be described with reference to FIG. 7.

First, the first partial data and second partial data transmitted from the management device 400 are received in step S510.

Through a communication route formed according to access information inserted into the first partial data and the second partial data, the controller 110 receives the first partial data transmitted via the first network device 200 located in the 3G network through the first communication unit 120 and receives the second partial data transmitted via the second network device 300 located in the WiFi network through the second communication unit 130.

Then, the controller 110 reconstitutes (or reconstructs) the data to be transmitted which the management device 400 desires to transmit by combining the first partial data and the second partial data according to particular virtual network access information based on the virtual network access information included in the received first partial data and second partial data to reconstitute (or generate) the data in steps S520 to S530.

The controller 110 can reconstitute (or generate) the original data to be transmitted by recognizing the first partial data and the second partial data having pre-allocated virtual network access information based on the virtual network access information included in the received several partial data, recognizing the first partial data and the second partial data from the same external device 500 by identifying the access information corresponding to an initial originator, that is, the access information of the external device 500, and mixing/combining the first partial data and the second partial data according to order information included in the corresponding partial data.

As described above, the first partial data and the second partial data divided by the management device 400 are transmitted to the terminal device 100 through the heterogeneous networks, and the transmitted first partial data and second partial data are combined by the terminal device 100 and then reconstituted as the original data to be transmitted.

Meanwhile, in the case where the controller 110 uses the simultaneous data transmission service with the management device 400, when the controller 110 receives notification of the problem occurrence of the WiFi network from the management device 400, the controller 110 receives both the first partial data and the second partial data through the 3G network corresponding to the effective network in steps S540 to S560.

When problem occurrence of the WiFi network is identified, the controller 110 receives the notification of the problem occurrence of the WiFi network from the management device 400 through the first network device 200 located in the 3G network corresponding to the effective network and receives the second partial data transmitted through the second network device 300 on the WiFi network through the first network device 200 located in the 3G network corresponding to the effective network.

Thereafter, the controller 100 reconstitutes (or generates) the data by combining the first partial data and the second partial data based on the virtual network access information included in the received first partial data and second partial data in steps S570 to S580.

The controller 110 reconstitutes (or reconstructs) the data to be transmitted which the management device 400 desires to transmit by combining the first partial data and the second partial data based on the virtual network access information included in the first partial data and the second partial data received from the first network device 200 to reconstitute (generate) the data.

In other words, the controller 110 can reconstitute (generate) the original data to be transmitted by recognizing the first partial data and the second partial data having the same virtual network access information based on the virtual network access information included in the received several partial data, and mixing/combining the first partial data and the second partial data according to order information included in the corresponding partial data.

Figure 8:
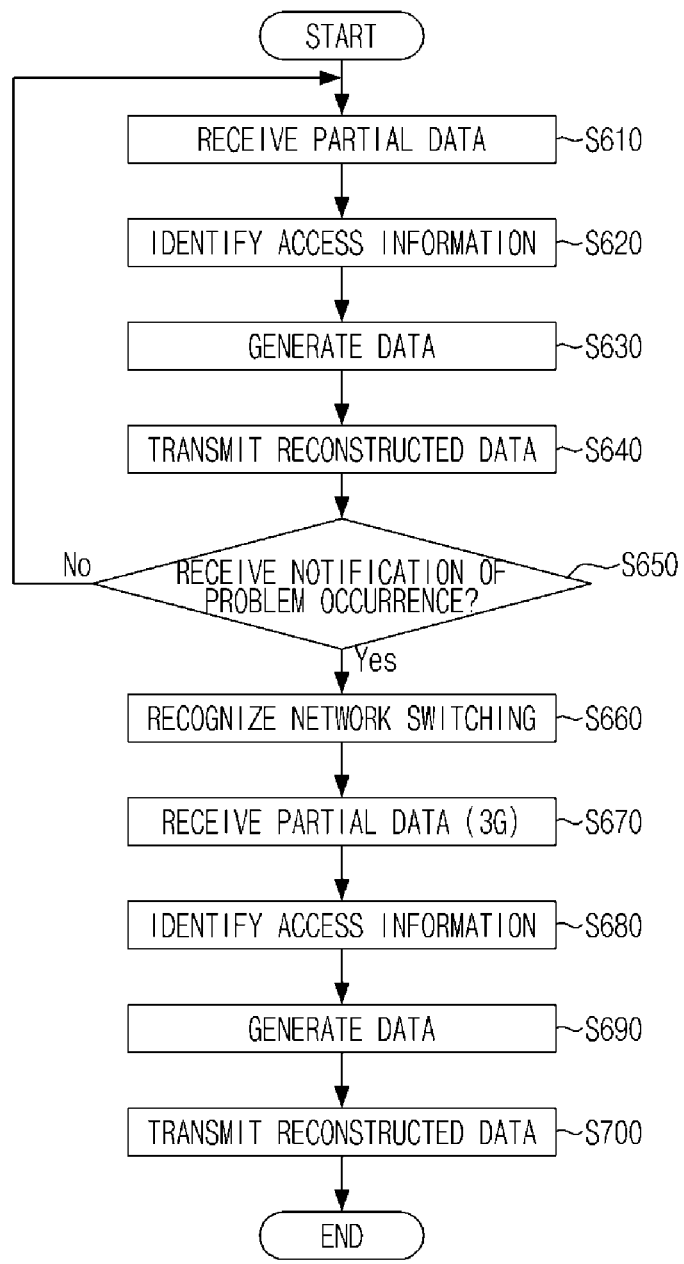
FIG. 8 is a flowchart of an uplink operation of a management device according to at least one embodiment of the present disclosure.

Hereinafter, an operation method of the management device 400 corresponding to the reception device for performing an uplink operation according to at least one embodiment of the present disclosure will be described with reference to FIG. 8.

First, the first partial data and second partial data transmitted from the terminal device 100 are received by the management device 400 in step S610.

Through transmission paths through which the first partial data and the second partial data pass according to the access information included in the headers of the first partial data and the second partial data, the controller 430 of the management device 400 receives the first partial data transmitted via the first network device 200 located in the 3G network through the first communication unit 410 and receives the second partial data transmitted via the second network device 300 located in the WiFi network through the second communication unit 420.

Then, the controller 430 reconstitutes (or reconstructs) the data to be transmitted which the terminal device 100 desires to transmit by combining the first partial data and the second partial data based on the virtual network access information included in the received first partial data and second partial data to reconstitute (or generate) the data in steps S620 to S630.

The controller 430 can reconstitute (or generate) the original data to be transmitted by recognizing the first partial data and the second partial data having the same virtual network access information based on the virtual network access information included in the received several partial data and mixing/combining the first partial data and the second partial data according to order information included in the corresponding partial data.

Further, the reconstituted data is transmitted to the external device 500 in step S640.

The controller 430 transmits the reconstituted data to be transmitted to the external device 500 by using access information of the external device corresponding to the final destination recognized through at least one partial data of the first partial data and the second partial data.

As described above, during the process in which the first partial data and the second partial data divided by the terminal device 100 pass through the management device 400 through the heterogeneous networks, the first partial data and the second partial data are combined by the management device 400 to be reconstituted as the original data to be transmitted, and then the reconstituted data to be transmitted is transmitted to the external device 500 corresponding to the final destination.

Meanwhile, in the case where the controller 430 uses the simultaneous data transmission service with the terminal device 100, when the controller 430 receives the notification of the problem occurrence of the WiFi network from the terminal device 100, the controller 430 receives both the first partial data and the second partial data through the 3G network corresponding to the effective network in steps S660 to S670.

When the problem occurrence of the WiFi network is identified, the controller 430 receives the notification of the problem occurrence of the WiFi network from the terminal device 100 through the first network device 200 located in the 3G network corresponding to the effective network and receives the second partial data transmitted through the second network device 300 on the WiFi network through the first network device 200 located in the 3G network corresponding to the effective network.

Further, the controller 430 reconstitutes (or generates) the data by combining the first partial data and the second partial data based on the virtual network access information included in the received first partial data and second partial data in step S680 to S690.

The controller 430 reconstitutes (or reconstructs) the data to be transmitted which the terminal device 100 desires to transmit by combining the first partial data and the second partial data based on the virtual network access information included in the first partial data and the second partial data received from the first network device 200 to reconstitute the data.

In other words, the controller 430 can reconstitute the original data to be transmitted by recognizing the first partial data and the second partial data having the same virtual network access information based on the virtual network access information included in the received several partial data, and mixing/combining the first partial data and the second partial data according to order information included in the corresponding partial data.

Thereafter, the controller 430 transmits the reconstituted data to be transmitted to the external device 500 by using the access information of the external device corresponding to the final destination recognized through at least one partial data of the first partial data and the second partial data in step S700.

That is, the first partial data and second partial data divided by the terminal device 100 are combined by the management device 400 and reconstituted as the original data to be transmitted during the process in which the first partial data and the second partial data pass through the management device 400 through the heterogeneous networks, and the reconstituted data to be transmitted is transmitted to the external device 500 corresponding to the final destination.

Figure 9:
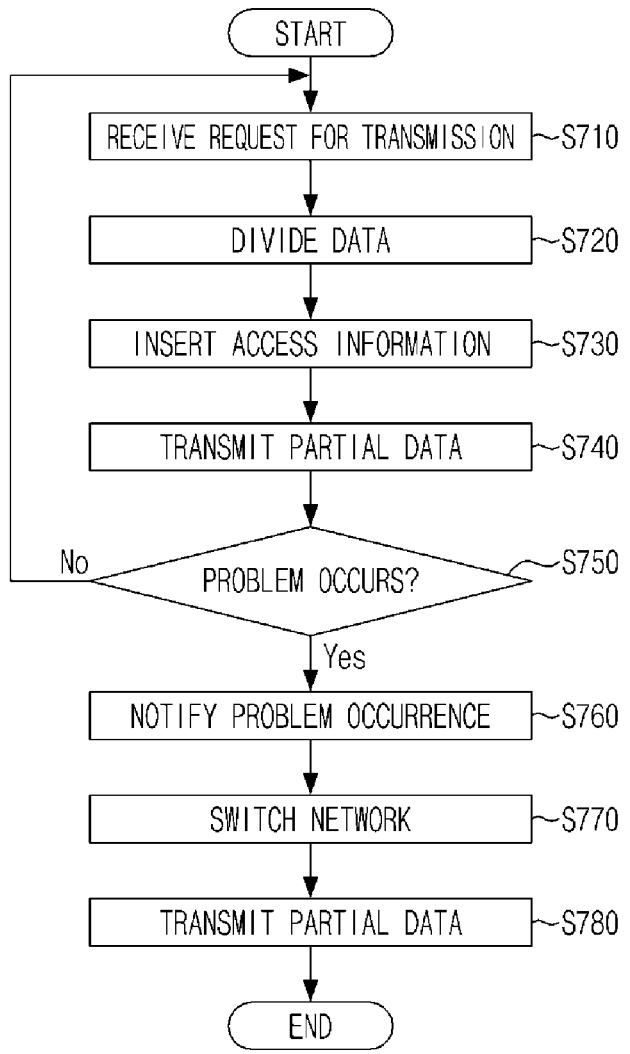
FIG. 9 is a flowchart of a downlink operation of a management device according to at least one embodiment of the present disclosure.

Hereinafter, an operation method of the management device 400 as the transmission device for performing a downlink operation according to at least one embodiment of the present disclosure will be described with reference to FIG. 9.

First, the management device 400 divides the data which is requested to be transmitted to the terminal device 100 from the external device 500 into partial data to use the simultaneous data transmission service in steps S710 to S720.

The controller 430 divides the data to be transmitted into partial data corresponding to the number of networks for the simultaneous data transmission using the heterogeneous network environment, that is, the 3G network and the WiFi network, and the division process may be performed according to a network selection policy transmitted from the policy management device 600.

In other words, the controller 430 of the management device 400 identifies a first transmission rate for data transmission to the first network device 200 and a second transmission rate for data transmission to the second network device 300 included in the network selection policy, selects the first partial data to be transmitted to the first network device 200 from the divided partial data, and selects the second partial data to be transmitted to the second network device 300 from the remaining partial data based on the identified transmission rates.

Accordingly, by performing the data division process based on the network selection policy and the traffic distribution rate for each network changed in real time, the controller 430 can apply relative usage rates of the 3G network and the WiFi network, for example, 10% of the 3G network and 90% of the WiFi network, 90% of the 3G network and 10% of the WiFi network, 50% of the 3G network and 50% of the WiFi network, 0% of the 3G network and 100% of the WiFi network and the like.

Then, the controller 430 inserts the virtual network access information into the first partial data and inserts the virtual network access information into the second partial data in step S730.

The controller 430 identifies access information for each network corresponding to the terminal device 100 which is the final destination of the current data transmission and virtual network access information based on table information for each pre-managed subscriber. For example, the controller 430 can identify the first network and second network access information corresponding to the terminal device 100 and the virtual network access information based on the table information for each subscriber.

Further, the controller 430 inserts the virtual network access information into the first partial data and inserts the virtual network access information into the second partial data.

That is, the controller 430 inserts its own first network access information corresponding to the corresponding first network, access information of the terminal device 100 corresponding to the corresponding first network, and access information of the external device 500 corresponding to the initial originator into the first partial data as well as the virtual network access information.

Further, the controller 430 inserts its own second network access information corresponding to the corresponding second network, access information of the terminal device 100 corresponding to the corresponding second network, and access information of the external device 500 corresponding to the initial originator into the second partial data as well as the virtual network access information.

Furthermore, the controller 430 provides the first partial data and the second partial data to the first communication unit 410 and the second communication unit 420 to transmit the first partial data and the second partial data to the terminal device 100 through the 3G network and the WiFi network based on the access information inserted into the header of each data in step S740.

The controller 430 provides the first partial data to the first communication unit 410 to transmit the first partial data to the first network device 200 located in the 3G network, and the first network device 200 transmits the first partial data to the management device 400 corresponding to the reception device. Further, the controller 430 provides the second partial data to the second communication unit 420 to transmit the second partial data to the second network device 300 located in the WiFi network, and the second network device 300 transmits the second partial data to the management device 400 corresponding to the reception device.

As described above, the first partial data divided by the controller 430 is transmitted to the terminal device 100 via the 3G network, and the second partial data divided by the controller 430 is transmitted to the terminal device 100 via the WiFi network.

Meanwhile, when the controller 430 uses the simultaneous data transmission service with the terminal device 100, the controller 430 identifies the problem occurrence of the particular network through monitoring the 3G network and the WiFi network in step S750.

During the process in which the controller 430 transmits the first partial data to the management device 400 through the first network device 200 located in the 3G network and transmits the second partial data to the management device 400 through the second network device 300 located in the WiFi network, the controller 430 identifies the problem occurrence of the particular network, for example, the WiFi network through pre-designated monitoring methods, for example, various methods such as identifying throughput of transmitted data for a predetermined time, detecting a network link status through the second network device 300, and detecting network disconnection based on whether a status signal having a regular cycle is received. Here, the WiFi network has greater variation in network mobility and stability than the 3G network, so that the following description will be made based on the problem occurrence of the WiFi network as described above.

The controller 430 switches the WiFi network to the 3G network corresponding to the effective network to transmit the second partial data transmitted through the WiFi network through the 3G network in steps S760 to S770. That is, when the WiFi network is identified to be on the problem occurrence, the controller 430 controls the communication unit 410 to transmit over the effective network, the 3G network (i.e., a first network), and to the reception device (i.e., the terminal device 100), the second partial data intended to be transmitted through the WiFi network (i.e., a second network).

When the problem occurrence of the WiFi network is identified through the monitoring method, the controller 430 notifies the problem occurrence of the WiFi network to the terminal device 100 through the first network device 200 located in the 3G network corresponding to an effective network and transmits the second partial data transmitted through the second network device 300 on the WiFi network through the first network device 200 located in the 3G network corresponding to the effective network.

In other words, for network switching transmission of the second partial data, the controller 430 inserts its own first network access information corresponding to the corresponding first network (i.e., assumed to be identified as an effective network, and referred to the 3G network), access information of the terminal device 100 corresponding to the corresponding first network, that is, access information of the management device 400 for the access to the 3G network, and access information of the external device 500 corresponding to the final destination into the second partial data as well as the virtual network access information. That is, the controller 430 of the management device 400 (i.e., configured or functioning as a transmission device) replaces the network access information of the terminal device 100 (i.e., configured or functioning as the reception device) corresponding to the second network (i.e., assumed to be identified as a problem occurrence network) previously inserted into the second partial data with the network access information of the terminal device 100 corresponding to the first network (i.e., assumed to be identified as an effective network) inserted into the first partial data.

Meanwhile, in order to achieve the same condition as that before the WiFi network problem occurrence is identified, the controller 430 inserts its own first network access information corresponding to the corresponding first network, access information of the management device 400 corresponding to the corresponding first network, that is, access information of the management device 400 for the access to the 3G network, and access information of the external device 500 corresponding to a final destination into the first partial data as well as the virtual network access information.

That is, according to the identification of the problem occurrence of the WiFi network, the controller 430 changes the conventional relative usage rate between the 3G network and the WiFi network such as 10% of the 3G network and 90% of the WiFi network, 90% of the 3G network and 10% of the WiFi network, 50% of the 3G network and 50% of the WiFi network, 0% of the 3G network and 100% of the WiFi network or the like into a relative usage rate such as 100% of the 3G network and 0% of the WiFi network, and then applies the changed relative usage rate.

Thereafter, the first partial data and the second partial data are transmitted through the 3G network in step S780.

The controller 430 provides the first partial data and the second partial data to the first communication unit 410 to transmit the first partial data and the second partial data to the first network device 200 located in the 3G network, and then the first network device 200 transmits the first partial data and the second partial data to the terminal device 100 as the reception device.

According to the method for providing a heterogeneous network based-simultaneous data transmission service according to the present disclosure, at the time of dividing data to be transmitted and simultaneously transmitting the divided data in a heterogeneous network environment, virtual network access information for achieving simultaneous link transmission through heterogeneous networks is managed after being additionally allocated to at least one terminal, so as to increase a data transmission speed and enable data transmission/reception through an effective network based on the virtual network access information and thus guarantee the service continuity even when a particular network is disconnected, thereby implementing an efficient and a highly reliable heterogeneous network based-simultaneous data transmission service.

According to the heterogeneous network based-simultaneous data transmission service system and method in accordance with some embodiments of the present disclosure, at the time of dividing data to be transmitted and simultaneously transmitting the divided data in a heterogeneous network environment, virtual network access information for achieving simultaneous link transmission through one or more heterogeneous networks is managed after being additionally allocated to each terminal, so as to increase a data transmission speed and enable data transmission and data reception through at least one effective network of the one or more heterogeneous networks based on the virtual network access information and thus guarantee the service continuity even when a particular network is disconnected.

Meanwhile, the methods or steps of the algorithm described related to some embodiments of the present disclosure may be directly realized in the form of hardware, software executed by a processor, or a combination thereof. The software module may reside in a storage medium, such as a RAM memory, a flash memory, a ROM memory, an EPROM memory, an EEPROM memory, registers, a hard disc, a mobile disc, a CD-ROM, or other storage devices. The storage medium is connected to the processor, so that the processor may read information from the storage medium or record the information onto the storage medium. Alternatively, the storage medium can be integrated in the processor. The processor and the storage medium may be included in application specific integrated circuits (ASIC). The ASIC may be included in one or more of the terminal device, the first network device, the second network device, the management device, the external device and/or the policy management device and other hardware elements in the heterogeneous network(s). Alternatively, the processor and the storage medium may serve as components of one or more of the terminal device, the first network device, the second network device, the management device, the external device, the policy management and other hardware elements in the heterogeneous network(s).

Some embodiments as described above may be implemented in the form of one or more program commands that can be read and executed by a variety of computer systems and be recorded in any non-transitory, computer-readable recording medium. The computer-readable recording medium may include a program command, a data file, a data structure, etc. alone or in combination. The program commands written to the medium are designed or configured especially for the at least one embodiment, or known to those skilled in computer software. Examples of the computer-readable recording medium include magnetic media such as a hard disk, a floppy disk, and a magnetic tape, optical media such as a CD-ROM and a DVD, magneto-optical media such as an optical disk, and a hardware device configured especially to store and execute a program, such as a ROM, a RAM, and a flash memory. Examples of a program command include a premium language code executable by a computer using an interpreter as well as a machine language code made by a compiler. The hardware device may be configured to operate as one or more software modules to implement one or more embodiments of the present disclosure. In some embodiments, one or more of the processes or functionality described herein is/are performed by specifically configured hardware (e.g., by one or more application specific integrated circuits or ASIC(s)). Some embodiments incorporate more than one of the described processes in a single ASIC. In some embodiments, one or more of the processes or functionality described herein is/are performed by at least one processor which is programmed for performing such processes or functionality.

While the present disclosure has been shown and described with reference to certain embodiments thereof, it will be understood by those skilled in the art that various changes in form and details may be made therein without departing from the subject matter, the spirit and scope of the present disclosure. Specific terms used in this disclosure and drawings are used for illustrative purposes and not to be considered as limitations of the present disclosure.

What is claimed is:

1. A transmission device for providing a simultaneous data transmission service over two or more networks in a heterogeneous network, the transmission device comprising:
 a controller configured to divide data to be transmitted into two or more partial data; and
 a communication unit configured to transmit the divided two or more partial data to a reception device through at least one of the two or more networks,
 wherein the controller is configured to
 insert, into first partial data of the divided two or more partial data, network access information of the reception device corresponding to a first network of the two or more networks and virtual network access information corresponding to the transmission device or the reception device, and
 insert, into second partial data of the divided two or more partial data, network access information of the reception device corresponding to a second network of the two or more networks and virtual network access information corresponding to the transmission device or the reception device, and
 the communication unit is configured to
 transmit the first partial data with the corresponding inserted information to the reception device through the first network, and
 transmit the second partial data with the corresponding inserted information to the reception device through the second network, wherein the first and second networks are different networks of heterogeneous networks, and
 wherein when problem occurrence of the first network is identified, the controller is configured to switch transmission of the first partial data from the first network to the second network, by replacing the network access information of the reception device corresponding to the first network previously inserted into the first partial data with the network access information of the reception device corresponding to the second network.

2. The transmission device of claim 1, wherein the controller is configured to control the communication unit to transmit, to the reception device and through the second network, the first partial data to be transmitted through the first network by using the replaced network access information of the reception device corresponding to the second network.

3. The transmission device of claim 1, wherein, when the problem occurrence of the first network is identified, the controller is configured to notify the problem occurrence to the reception device.

4. A reception device for providing a simultaneous data transmission service over two or more networks in a heterogeneous network, the reception device comprising:
 a communication unit configured to receive two or more partial data divided from data to be transmitted from a transmission device through at least one of the two or more networks; and
 a controller configured to combine the received two or more partial data by using virtual network access information corresponding to the transmission device or the reception device inserted into the received two or more partial data,
 wherein the virtual network access information is independent of the two or more networks,
 wherein the communication unit comprises a first communication unit and a second communication unit, wherein the first communication unit is configured to receive, over a first network of the two or more networks, first partial data of the received one or more partial data, the first partial data including network access information of the reception device corresponding to the first network, and
 the second communication unit is configured to receive, over a second network of the two or more networks, second partial data of the received one or more partial data, the second partial data including network access information of the reception device corresponding to the second network, and
 wherein, when problem occurrence of the first network of the two or more networks is identified, the communication unit is configured to receive, over the second network, the first partial data including the network access information of the reception device corresponding to the second network in place of the network access information of the reception device corresponding to the first network.

5. The reception device of claim 4, wherein the controller is configured to
 determine the received first partial data and the received second partial data as partial data transmitted from the transmission device based on the virtual network access information inserted into the first partial data and the second partial data, and
 reconstitute the data to be transmitted from the transmission device by combining the first partial data and the second partial data.

6. The reception device of claim 4, wherein the communication unit is configured to receive the first partial data to be received through the first network through the second network by using the replaced network access information of the reception device corresponding to the second network.

7. The reception device of claim 6, wherein the communication unit is configured to receive the first partial data through the second network after receiving notification of the problem occurrence of the first network from the transmission device.

8. A method of operating a transmission device for providing simultaneous data transmission service over two or more networks in a heterogeneous network, the method performed by the transmission device and comprising:
 dividing data to be transmitted into two or more partial data;
 transmitting first partial data of the divided two or more partial data over a first network of the two or more networks, the first partial data including network access information of a reception device corresponding to the first network and virtual network access information corresponding to the transmission device or the reception device, and
 transmitting second partial data of the divided two or more partial data, over a second network of the two or more networks, the second partial data including network access information of the reception device corresponding to the second network and virtual network access information corresponding to the transmission device or the reception device,
 wherein the method further comprises:
 identifying problem occurrence of the first network; and
 replacing the network access information of the reception device corresponding to the first network included in the first partial data with the network access information of the reception device corresponding to the second network.

9. The method of claim 8, wherein, after the replacing of the network access information, the method further comprises transmitting the first partial data to be transmitted through the first network to the reception device through the second network by using the replaced network access information of the reception device corresponding to the second network.

10. The method of claim 8, further comprising,
notifying the problem occurrence to the reception device after the identifying of the problem occurrence.

11. A method of operating a reception device for providing a simultaneous data transmission service over two or more networks in a heterogeneous network, the method performed by the reception device and comprising:
receiving two or more partial data divided from data to be transmitted from a transmission device through the two or more networks;
identifying virtual network access information corresponding to the transmission device or the reception device included in the received two or more partial data, wherein the virtual network access information is independent of the two or more networks; and
reconstituting the data by combining the received two or more partial data based on the identified virtual network access information,
wherein the receiving of the two or more partial data comprises
receiving the first partial data over the second network, the first partial data including the network access information of the reception device corresponding to the second network in place of the network access information of the reception device corresponding to the first network, when problem occurrence of the first network is identified.

12. The method of claim 11, wherein the receiving of the two or more partial data comprises
receiving, over a first network of the two or more networks, first partial data of the received two or more partial data including network access information of the reception device corresponding to a first network of the two or more networks and
receiving, over a second network of the two or more networks, second partial data of the received two or more partial data including network access information of the reception device corresponding to a second network of the two or more networks.

13. The method of claim 12, wherein the reconstituting of the data comprises
determining the received first partial data and the received second partial data as partial data transmitted from the transmission device based on the virtual network access information included into the received first partial data and the received second partial data to combine the received first partial data and the received second partial data.

14. The method of claim 11, wherein the receiving of the two or more partial data comprises
receiving over the second network the first partial data to be received through the first network by using the replaced network access information of the reception device corresponding to the second network.

15. The method of claim 14, further comprising,
receiving notification of the problem occurrence of the first network from the transmission device before receiving the first partial data.

\* \* \* \* \*